United States Patent
Yoon et al.

(10) Patent No.: US 9,594,279 B2
(45) Date of Patent: Mar. 14, 2017

(54) LIQUID CRYSTAL DISPLAY

(71) Applicant: Samsung Display Co., Ltd., Yongin, Gyeonggi-Do (KR)

(72) Inventors: Hyung Guen Yoon, Hwaseong-si (KR); Sung-Jae Yun, Hwaseong-si (KR); Oh Jeong Kwon, Hwaseong-si (KR); Jae Hong Park, Seoul (KR); Jin Won Kim, Suwon-si (KR); Kyung Hae Park, Seongnam-si (KR); Dong-Chul Shin, Seoul (KR)

(73) Assignee: Samsung Display Co., Ltd. (KR)

( * ) Notice: Subject to any disclaimer, the term of this patent is extended or adjusted under 35 U.S.C. 154(b) by 67 days.

(21) Appl. No.: 14/188,458

(22) Filed: Feb. 24, 2014

(65) Prior Publication Data
US 2014/0253859 A1 Sep. 11, 2014

(30) Foreign Application Priority Data
Mar. 6, 2013 (KR) .................. 10-2013-0024129

(51) Int. Cl.
| G02F 1/1343 | (2006.01) |
| G02F 1/1337 | (2006.01) |
| G02F 1/139 | (2006.01) |

(52) U.S. Cl.
CPC ...... *G02F 1/134336* (2013.01); *G02F 1/1393* (2013.01); *G02F 1/133707* (2013.01); *G02F 1/133753* (2013.01); *G02F 1/134309* (2013.01); *G02F 2001/134318* (2013.01)

(58) Field of Classification Search
CPC ........... G02F 1/134336; G02F 1/13624; G02F 1/1337; G02F 2001/134345; G02F 1/133753; G02F 1/133707
USPC .................................. 249/144, 141, 130
See application file for complete search history.

(56) References Cited

U.S. PATENT DOCUMENTS

| 6,512,568 B2 | 1/2003 | Song et al. |
| 6,801,286 B2 | 10/2004 | Yamaguchi et al. |
| 7,064,348 B2 | 6/2006 | Kim et al. |
| 7,929,093 B2 | 4/2011 | Liu et al. |
| 2004/0252265 A1 | 12/2004 | Ma et al. |
| 2006/0012741 A1 | 1/2006 | Mizusako |

(Continued)

FOREIGN PATENT DOCUMENTS

| JP | 2006-113206 | 4/2006 |
| JP | 2007-249241 | 9/2007 |

(Continued)

*Primary Examiner* — Richard Kim
(74) *Attorney, Agent, or Firm* — Innovation Counsel LLP

(57) ABSTRACT

Provided is a liquid crystal display, including: a first substrate; a pixel electrode disposed on the first substrate; a second substrate facing the first substrate; a common electrode disposed on the second substrate; and a liquid crystal layer disposed between the first substrate and the second substrate, the liquid crystal layer including a plurality of liquid crystal molecules, in which the common electrode includes a cross-shaped cutout, the cross-shaped cutout overlapping the pixel electrode and dividing the pixel electrode into a plurality of subregions, and the pixel electrode includes a direction controller extend in a direction parallel to a line connecting an intersecting point of the cross-shaped cutout and a pixel corner edge opposing the intersecting point.

23 Claims, 22 Drawing Sheets

(56) References Cited

U.S. PATENT DOCUMENTS

| | | |
|---|---|---|
| 2006/0197898 A1 | 9/2006 | Kurasawa |
| 2006/0208984 A1* | 9/2006 | Kim .................... G09G 3/3648 |
| | | 345/90 |
| 2008/0180607 A1* | 7/2008 | Su .................... G02F 1/133707 |
| | | 349/106 |
| 2008/0284953 A1 | 11/2008 | Takahashi et al. |
| 2009/0244425 A1* | 10/2009 | Jung ................ G02F 1/133753 |
| | | 349/48 |
| 2011/0037932 A1 | 2/2011 | Takahashi |
| 2011/0261278 A1 | 10/2011 | Oh et al. |
| 2012/0147302 A1 | 6/2012 | Nakagawa et al. |
| 2012/0281172 A1* | 11/2012 | Park ................. G02F 1/133707 |
| | | 349/123 |

FOREIGN PATENT DOCUMENTS

| | | |
|---|---|---|
| JP | 2011-085738 | 4/2011 |
| KR | 10-2001-0063302 A | 7/2001 |
| KR | 10-0648210 | 11/2006 |
| KR | 10-2008-0099038 A | 11/2008 |
| KR | 10-2009-0027474 A | 3/2009 |

\* cited by examiner

FIG.19
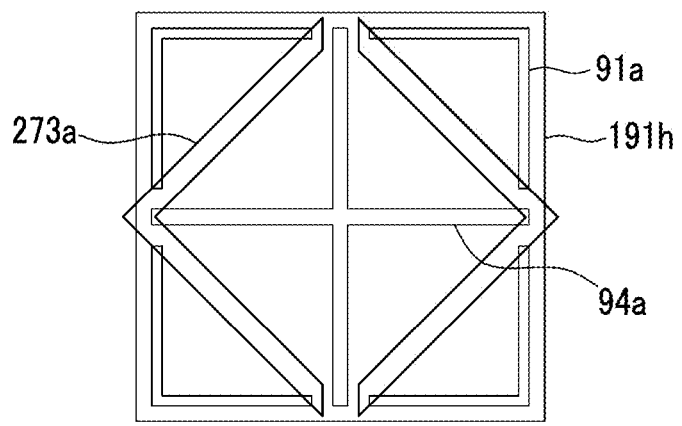
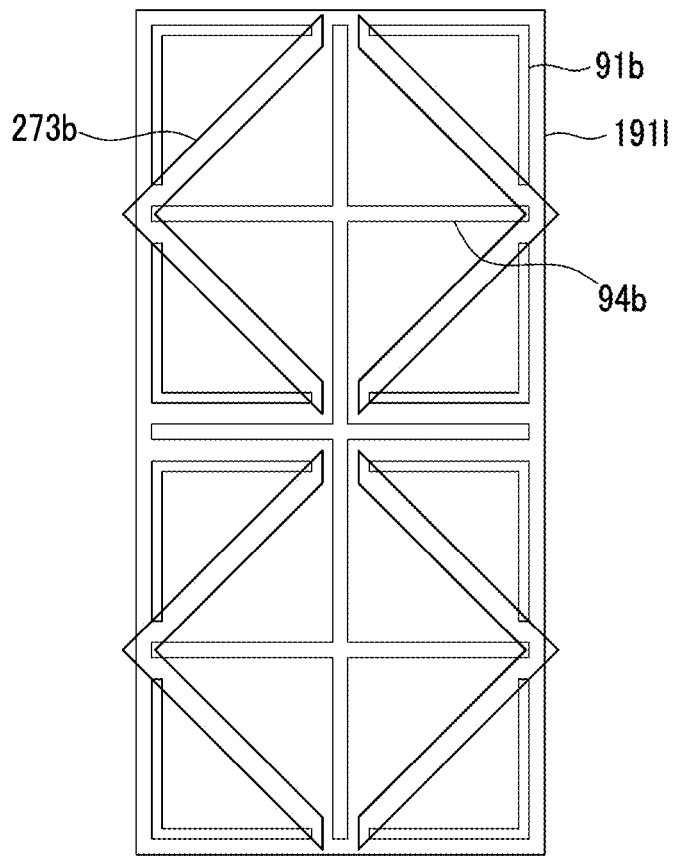

FIG.21
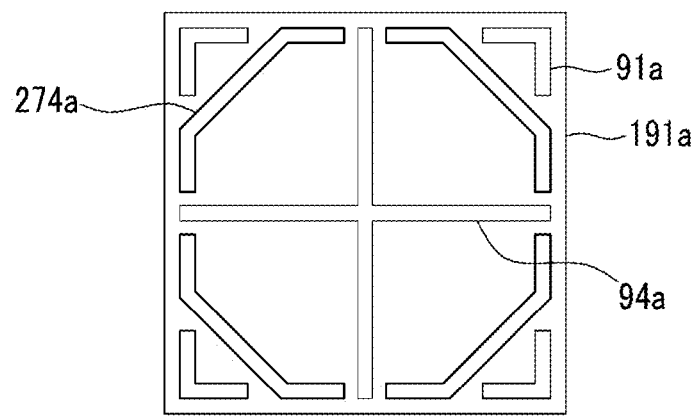
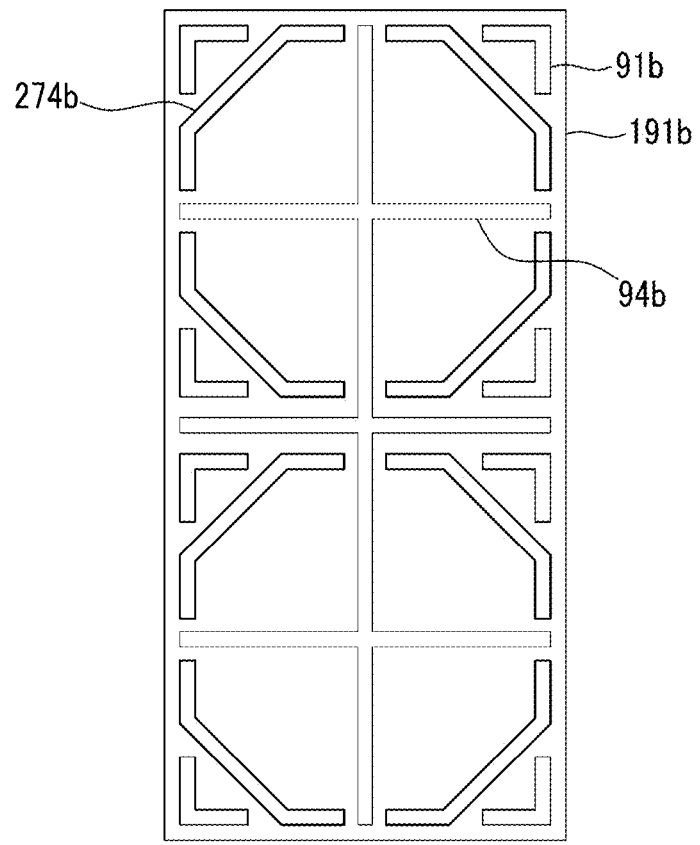

FIG.23
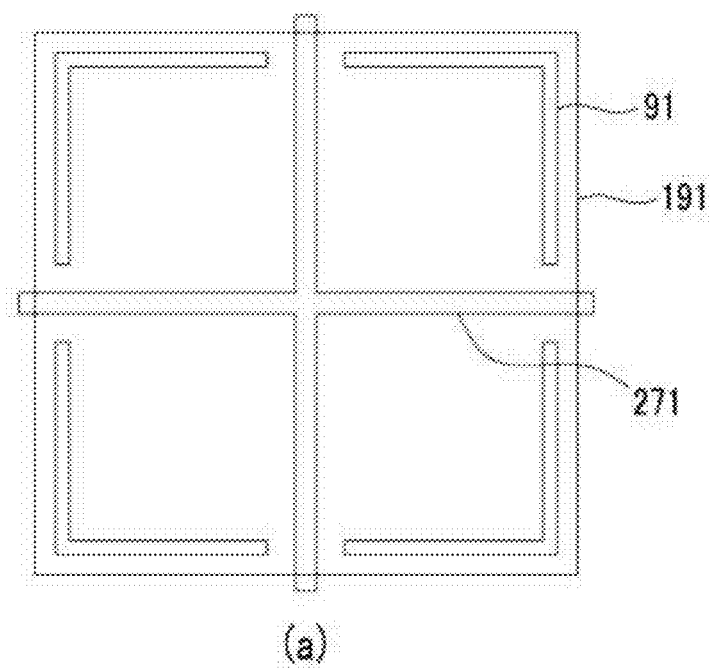
(a)
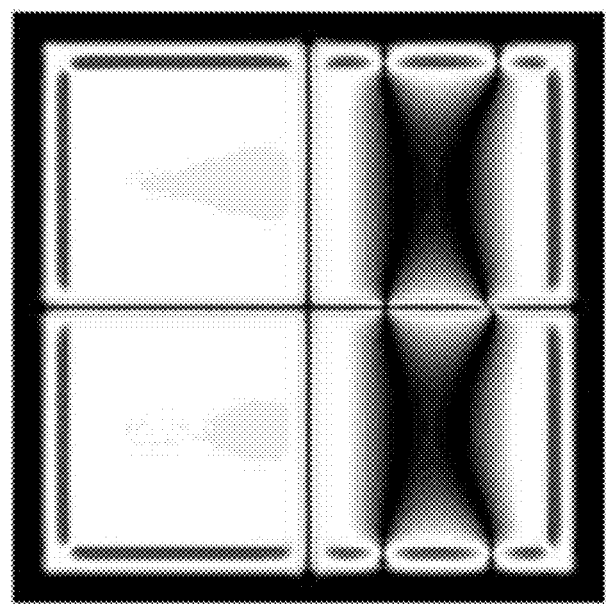
(b)

FIG.24
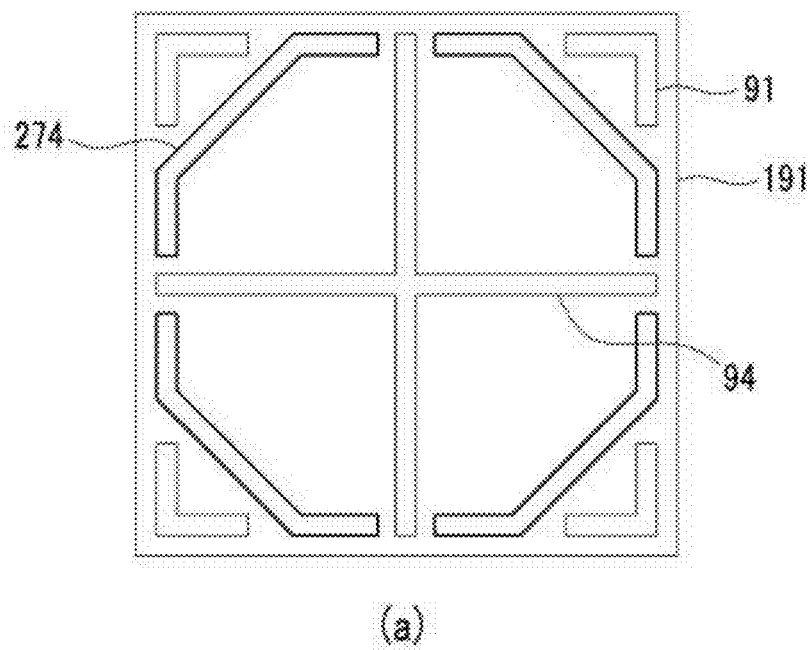
(a)
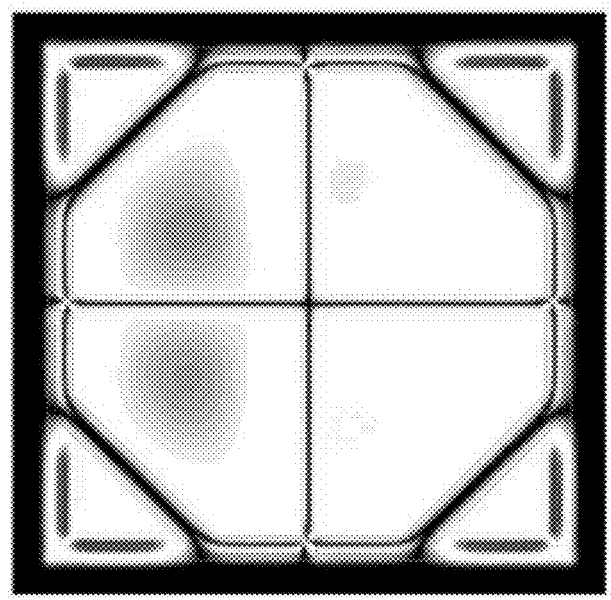
(b)

FIG.25
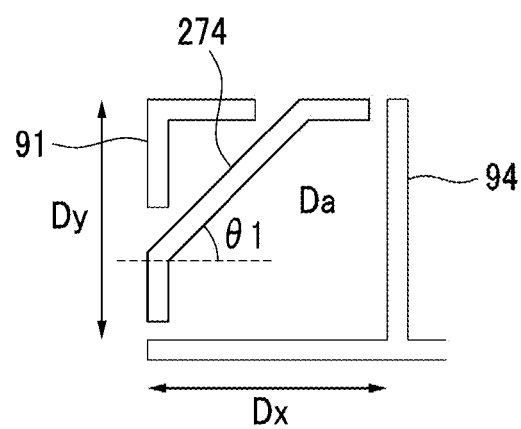
(a)
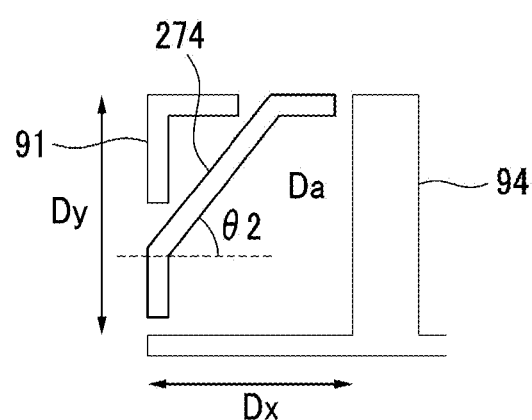
(b)

LIQUID CRYSTAL DISPLAY

CROSS-REFERENCE TO RELATED APPLICATION

This application claims priority to and the benefit of Korean Patent Application No. 10-2013-0024129 filed in the Korean Intellectual Property Office on Mar. 6, 2013, the entire contents of which are incorporated herein by reference.

BACKGROUND (a) Technical Field

Embodiments of the present invention relate to a liquid crystal display.

(b) Description of the Related Art

A liquid crystal display, which is one of the most common types of flat panel displays currently in use, includes two sheets of display panels with field generating electrodes such as a pixel electrode, a common electrode, and the like and a liquid crystal layer interposed therebetween. The liquid crystal display device generates an electric field in the liquid crystal layer by applying voltages to the field generating electrodes, and determines the direction of liquid crystal molecules of the liquid crystal layer by the generated electric field, thus controlling polarization of incident light so as to display images.

Among the liquid crystal displays, a vertically aligned mode liquid crystal display in which liquid crystal molecules are aligned so that long axes thereof are vertical to the display panels while the electric field is not applied has been developed.

In the vertically aligned mode liquid crystal display, it is important to secure a wide viewing angle, and to this end, a method of forming a plurality of domains is used by forming domain controlling patterns such as minute cutouts or protrusions in the field generating electrode. Since the cutouts and the protrusions determine tilt directions of the liquid crystal molecules, the cutouts and the protrusions are appropriately disposed and the plurality of domains having different tilt directions of the liquid crystal molecules are formed, thereby increasing a viewing angle and a visibility of the liquid crystal display.

Particularly, when the minute cutouts are formed on the pixel electrode to have a plurality of branch electrodes, the liquid crystal molecules in a central region of each domain may be easily controlled, but an aperture ratio of the liquid crystal display is reduced.

The above information disclosed in this Background section is only for improvement of understanding of the background of the invention and therefore it may contain information that does not form a prior art that is known to a person having ordinary skill in the art.

SUMMARY

Embodiments of the present invention have been made in an effort to provide a liquid crystal display having advantages of having a wide viewing angle and a rapid response speed, reducing decrease of an aperture ratio of the liquid crystal display, and controlling liquid crystal molecules even in a central region of each domain.

An exemplary embodiment of the present invention provides a liquid crystal display, including: a first substrate; a pixel electrode disposed on the first substrate; a second substrate facing the first substrate; a common electrode disposed on the second substrate; and a liquid crystal layer disposed between the first substrate and the second substrate, the liquid crystal layer including a plurality of liquid crystal molecules, in which the common electrode may include a cross-shaped cutout, the cross-shaped cutout overlapping the pixel electrode and dividing the pixel electrode into a plurality of subregions, and the pixel electrode may include a direction controller extending in a direction parallel to a line connecting an intersecting point of the cross-shaped cutout and a pixel corner edge opposing the intersecting point.

The direction controller may be disposed at least one central portion of the plurality of subregions.

The direction controller may be a cutout formed in the pixel electrode, or a concave portion or a convex portion of the surface of the pixel electrode.

The direction controller may be disposed in a region corresponding to the most central portion among nine equal parts of each of the plurality of subregions.

The pixel electrode may have a cutout formed along one of the edges of the pixel electrode.

The liquid crystal molecules of the liquid crystal layer may be aligned to have pretilts in a direction parallel to the line connecting the intersecting point of the cross-shaped cutout and the pixel corner edge opposing the intersecting point.

The liquid crystal molecules of the liquid crystal layer may be aligned to be substantially vertical to the surfaces of the first substrate and the second substrate, when an electric field is not applied in the liquid crystal layer.

The direction controller may be disposed at least a portion of the pixel electrode near the pixel corner edge opposing the intersecting point. The pixel electrode may have a cutout formed along one of the edges of the pixel electrode, and the direction controller extends from the cutout of the pixel electrode, the direction controller being a plurality of minute cutouts.

Yet another exemplary embodiment of the present invention provides a liquid crystal display, including: a first substrate; a pixel electrode disposed on the first substrate; a second substrate facing the first substrate; a common electrode disposed on the second substrate; and a liquid crystal layer disposed between the first substrate and the second substrate, the liquid crystal layer including a plurality of liquid crystal molecules, in which the pixel electrode may have a cross-shaped first cutout, the pixel electrode is divided into a plurality of subregions by the cross-shaped cutout, the cross-shaped cutout overlapping edges of the pixel electrode and the common electrode may include a second cutout including a diagonal portion extending in a direction parallel to a line connecting two adjacent overlapping points in which the cross-shaped first cutout and the edges of the pixel electrode overlap.

The second cutout may further include a straight-line portion extending to be parallel to the edge of the pixel electrode and protruding from the diagonal portion.

The straight-line portion may include a horizontal portion and a vertical portion, and lengths of the horizontal portion and the vertical portion are substantially the same as or different from each other.

The pixel electrode may further have a third cutout formed along one of the edges of the pixel electrode, and the third cutout of the pixel electrode may not be overlapped with the second cutout of the common electrode.

According to the exemplary embodiments of the present invention, the liquid crystal display has a wide viewing angle and a rapid response speed, reduces decrease of an aperture ratio of the liquid crystal display, and controls liquid crystal molecules even in a central region of each domain.

BRIEF DESCRIPTION OF THE DRAWINGS

FIG. 19 is a plan view illustrating a field generating electrode of the liquid crystal display according to another exemplary embodiment of the present invention.

FIG. 21 is a plan view illustrating a field generating electrode of the liquid crystal display according to another exemplary embodiment of the present invention.

FIGS. 23 to 24 are plan views illustrating results of transmittance of the liquid crystal display according to an Experimental Example of the present invention.

FIG. 25 is a schematic view illustrating a part of the field generating electrode of the liquid crystal display according to another exemplary embodiment of the present invention.

DETAILED DESCRIPTION OF THE EMBODIMENTS

Figure 1:
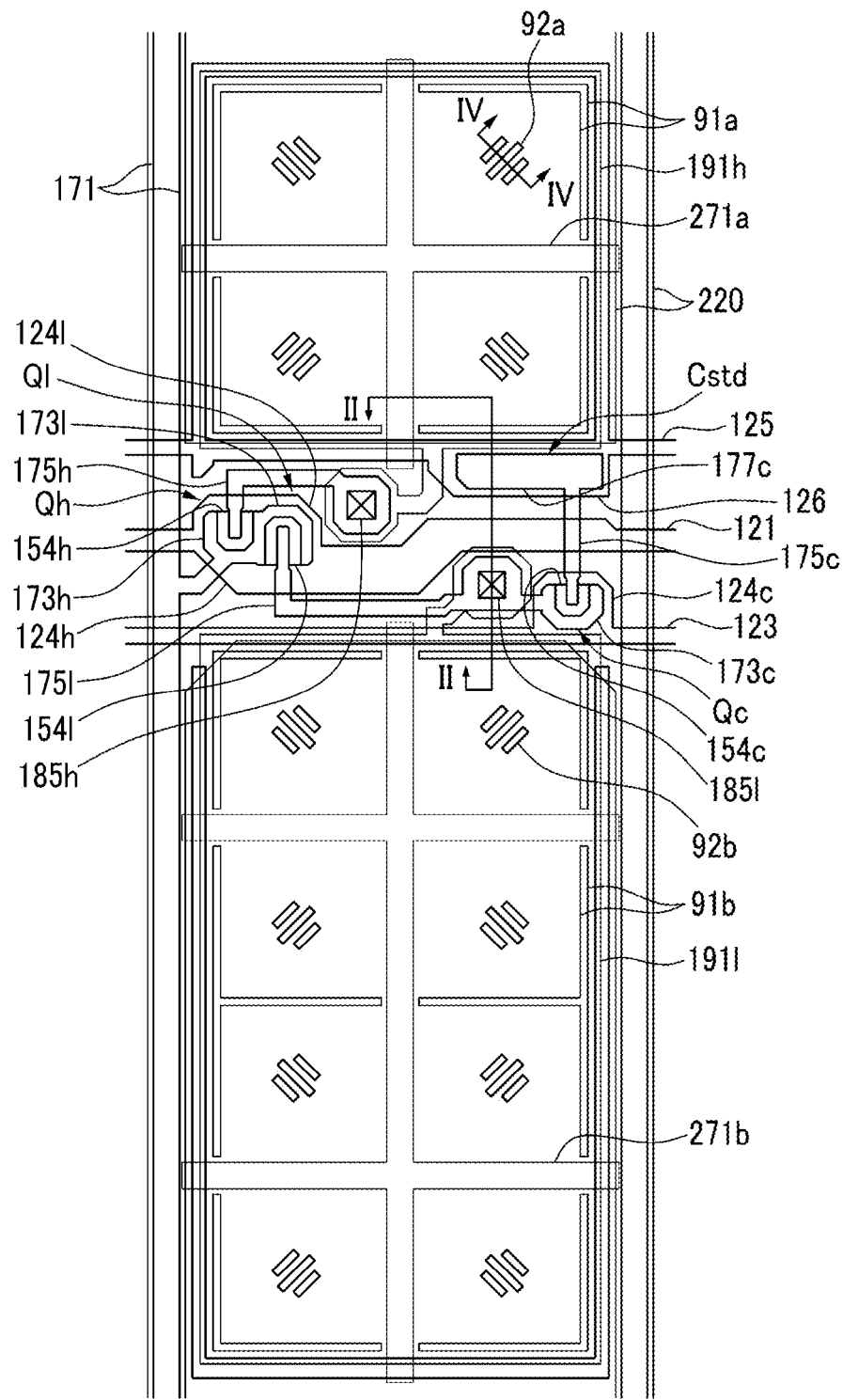
FIG. 1 is a layout view illustrating a liquid crystal display according to an exemplary embodiment of the present invention.

Embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Then, a liquid crystal display according to an exemplary embodiment of the present invention will be described with reference to FIGS. 1 and 2. FIG. 1 is a layout view illustrating a liquid crystal display according to an exemplary embodiment of the present invention, and FIG. 2 is a cross-sectional view of the liquid crystal display of FIG. 1 taken along line II-II.

Figure 2:
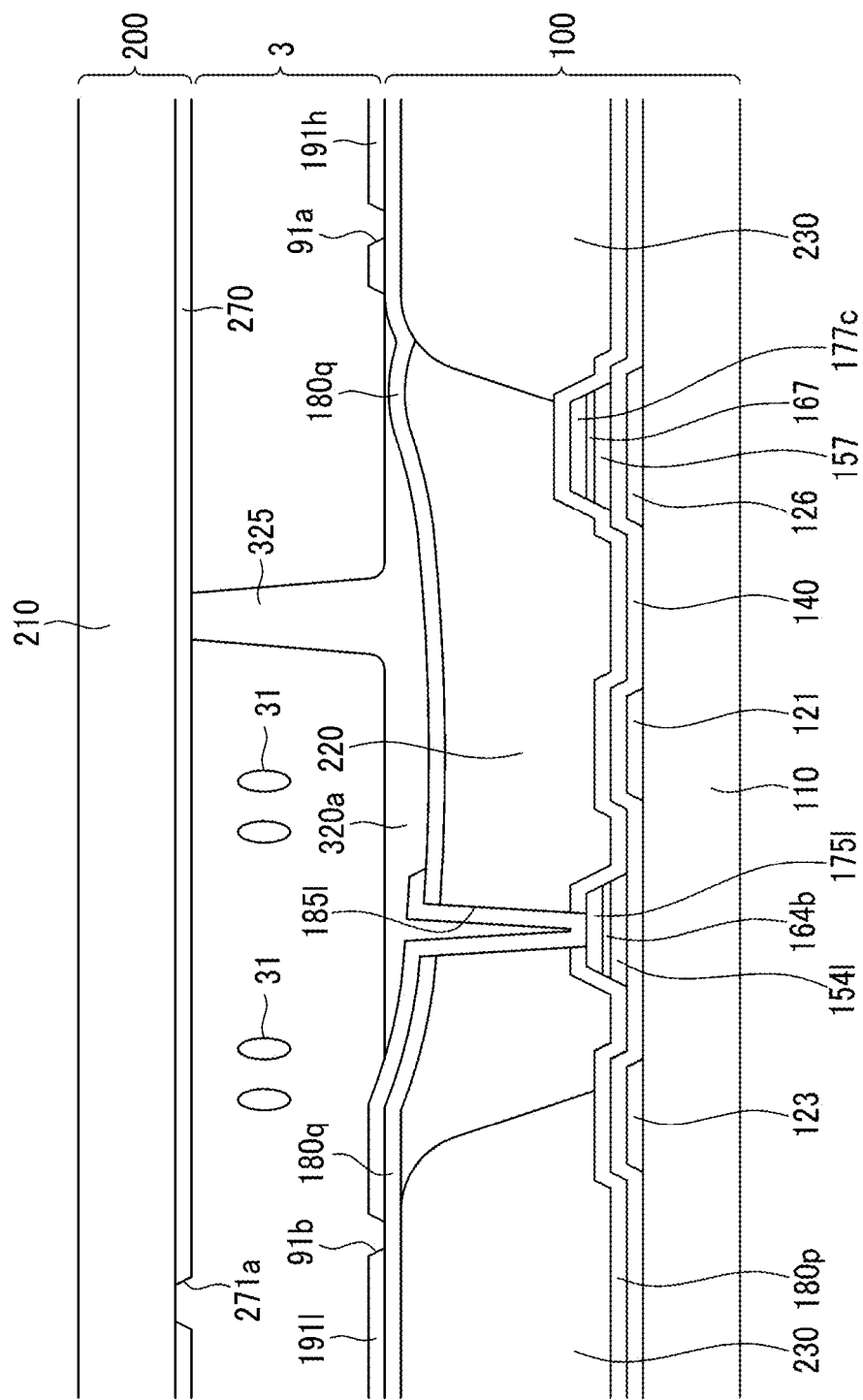
FIG. 2 is a cross-sectional view of the liquid crystal display of FIG. 1 taken along line II-II.

Referring to FIGS. 1 and 2, the liquid crystal display according to the exemplary embodiment includes a lower panel 100 and an upper panel 200 facing each other, a liquid crystal layer 3 interposed between the two panels 100 and 200, and a pair of polarizers (not illustrated) attached to outer surfaces of the panels 100 and 200.

First, the lower panel 100 will be described.

A plurality of gate conductors including a plurality of gate lines 121, a plurality of step-down gate lines 123, and a plurality of storage electrode lines 125 is formed on an insulation substrate 110.

The gate line 121 and the step-down gate line 123 mainly extend in a horizontal direction to transfer gate signals. The gate line 121 may include a first gate electrode 124h and a second gate electrode 124I protruding upward and downward, and the step-down gate line 123 may include a third gate electrode 124c protruding upward. The first gate electrode 124h and the second gate electrode 124I are connected with each other to form one protrusion.

The storage electrode line 125 mainly extends in a horizontal direction to transfer a predetermined voltage such as a common voltage. The storage electrode line 125 includes a storage electrode extending along an edge of the first subpixel electrode 191h and an expanded capacitor electrode 126.

A gate insulating layer 140 is formed on the gate lines 121, 123, and the storage electrode line 125.

A plurality of semiconductors 154h, 154l, 154c, 157 made of amorphous or crystalline silicon or the like is formed on the gate insulating layer 140. The semiconductors include first and second semiconductors 154h and 154l extending toward the first and second gate electrodes 124h and 124l and connected with each other, and a third semiconductor 154c connected with the second semiconductor 154l. The third semiconductor 154c is extended to form a fourth semiconductor 157.

A plurality of ohmic contacts (not illustrated) is formed on the semiconductors 154h, 154l, 154c, 157. A first ohmic contact (not illustrated) is formed on the first semiconductor 154h, and a second ohmic contact 164b and a third ohmic contact (not illustrated) are formed on the second semiconductor 154l and the third semiconductor 154c, respectively. The third ohmic contact is extended to form a fourth ohmic contact 167.

Data conductors including a plurality of data lines 171, a plurality of first drain electrodes 175h, a plurality of second drain electrodes 175l, and a plurality of third drain electrodes 175c are formed on the ohmic contacts 164b and 167.

The data lines 171 transfer data signals and mainly extend in a vertical direction to cross the gate lines 121 and the step-down gate lines 123. Each data line 171 includes a first source electrode 173h and a second source electrode 173l which extend toward the first gate electrode 124h and the second gate electrode 124l.

The first drain electrode 175h, the second drain electrode 175I, and the third drain electrode 175c include one wide end portion and the other rod-shaped end portion, respectively. The rod-shaped end portions of the first drain electrode 175h and the second drain electrode 175l are partially surrounded by the first source electrode 173h and the second source electrode 173l. One wide end portion of the second drain electrode 175l is again extended to form a third source electrode 173c which is bent in a 'U'-lettered shape. A wide end portion 177c of the third drain electrode 175c is overlapped with the capacitor electrode 126 to form a step-down capacitor Cstd, and the rod-shaped end portion is partially surrounded by the third source electrode 173c.

The first/second/third gate electrodes 124h/124l/124c, the first/second/third source electrodes 173h/173l/173c, and the first/second/third drain electrodes 175h/175l/175c form first/second/third thin film transistors (TFTs) Qh/Ql/Qc together with the first/second/third semiconductor islands 154h/154l/154c, respectively, and channels of the thin film transistors are formed in the respective semiconductors 154h/154l/154c between the respective source electrodes 173h/173l/173c and the respective drain electrodes 175h/175l/175c.

The semiconductors 154h, 154l, and 154c has substantially the same plane shape as the data conductors 171, 175h, 175l, and 175c and the ohmic contacts 164b and 167 therebelow, except for channel regions between the source electrodes 173h, 173l, and 173c and the drain electrodes 175h, 175l, and 175c. That is, the semiconductor 154h, 154l, and 154c includes exposed portions not covered by the data conductors 171, 175h, 175l, and 175c such as a space between the source electrodes 173h, 173l, and 173c and the drain electrodes 175h, 175l, and 175c.

A lower passivation layer 180p made of an inorganic insulator such as silicon nitride or silicon oxide is formed on the data conductors 171, 175h, 175l, and 175c and the exposed portion of the semiconductors 154h, 154l, and 154c.

Color filters 230 are disposed on the lower passivation layer 180p. The color filters 230 are disposed in most of regions except for a place where the first thin film transistor Qh, the second thin film transistor Ql, and the third thin film transistor Qc are disposed. However, the color filters 230 may be elongated in a vertical direction along a space between the adjacent data lines. Each color filter 230 may display one of primary colors such as three primary colors of red, green and blue.

A light blocking member 220 is disposed on a region where the color filter 230 is not disposed and a portion of the color filter 230. The light blocking member 220 is called a black matrix and blocks light leakage. The light blocking member 220 extends along the gate line 121 and the step-down gate line 123 to be expanded upward and downward, and includes a first light blocking member (not shown) which covers a region in which the first thin film transistor Qh, the second thin film transistor Ql, and the third thin film transistor Qc are disposed and a second light blocking member (not shown) which extends along the data line 171. A height of a part of the light blocking member 220 may be smaller than a height of the color filter 230.

An upper passivation layer 180q is formed on the color filter 230 and the light blocking member 220. The upper passivation layer 180q may prevent the color filter 230 and the light blocking member 220 from being lifted, and prevent defects such as an afterimage which may be caused by impurities such as an organic material from the color filter 230.

A plurality of first contact holes 185h and a plurality of second contact holes 185l exposing the wide end portion of the first drain electrode 175h and the wide end portion of the second drain electrode 175l, respectively, are formed in the lower passivation layer 180p, the light blocking member 220, and the upper passivation layer 180q.

A plurality of pixel electrodes 191 is formed on the upper passivation layer 180q.

Referring to FIG. 2, each pixel electrode 191 includes the first subpixel electrode 191h and the second subpixel electrode 191I separated from each other with two gate lines 121 and 123 therebetween and disposed upper and lower a pixel area with respect to the gate lines 121 and 123 to be adjacent to each other in a column direction.

The pixel electrode 191 has a plurality of cutouts 91a and 91b formed along an edge thereof. The cutout 91a of the pixel electrode 191 is formed along an edge of the first subpixel electrode 191h, and the cutout 91b is formed along an edge of the second subpixel electrode 191I.

By forming the cutouts 91a and 91b along the edges of the pixel electrode 191, tilt directions of directors of the liquid crystal molecules disposed at the edges of the pixel electrodes 191h and 191l may be controlled by reducing magnitude of a fringe field which influences the edge of the pixel area.

The pixel electrode 191 has direction controllers 92a and 92b. The direction controllers 92a and 92b may be the cutouts formed in the pixel electrode 191, or concave portions or convex portions on the surface of the pixel electrode. The direction controllers 92a and 92b prevent irregular movement of the liquid crystal molecules which may occur in the central portion of the domain by additionally controlling the tilt directions of the directors of the liquid crystal molecules in the central portion of the domain of the pixel area to be described below, more particularly, azimuthal angles which are directions of the directors of the liquid crystal molecules, thereby preventing deterioration of display quality such as a texture due to the irregular movement of the liquid crystal molecules or deterioration of transmittance. Here, the azimuthal angle means a tilt angle based on the signal line of the liquid crystal display, for example, the gate line or the data line, when the directors of the liquid crystal molecules are projected to the substrate surface.

The first subpixel electrode 191h and the second subpixel electrode 191l receive data voltages from the first drain electrode 175h and the second drain electrode 175l through the first contact hole 185h and the second contact hole 185l, respectively. The first subpixel electrode 191h and the second subpixel electrode 191l supplied with the data voltages which generate an electric field together with a common electrode 270 of a common electrode panel 200 to determine directions of the liquid crystal molecules of the liquid crystal layer 3 between two electrodes 191 and 270. As such, luminance of light passing through the liquid crystal layer 3 varies according to the determined directions of the liquid crystal molecules.

The first subpixel electrode 191h and the common electrode 270 form a first liquid crystal capacitor together with the liquid crystal layer 3 therebetween, and the second subpixel electrode 191l and the common electrode 270 form a second liquid crystal capacitor together with the liquid crystal layer 3 therebetween. As a result, even after the first and second thin film transistors Qh and Ql are turned off, the applied voltage is maintained.

The first and second subpixel electrodes 191h and 191l are overlapped with the storage electrode line 125 in addition to the storage electrode 129 to form the first and the second storage capacitors, and the first and the second storage capacitors reinforce voltage maintaining capacity of the first and the second liquid crystal capacitors.

The capacitor electrode 126 and the expansion 177c of the third drain electrode 175c are overlapped with each other with the gate insulating layer 140 and the semiconductor layers 157 and 167 therebetween to form the step-down capacitor Cstd. In another exemplary embodiment of the present invention, the semiconductor layers 157 and 167 which are disposed between the capacitor electrode 126 and the expansion 177c of the third drain electrode 175c which form the step-down capacitor Cstd may be removed.

A colored member 320a is formed on the upper passivation layer 180q. The colored member 320a is disposed on the light blocking member 220. The colored member 320a extends along the gate line 121 and the step-down gate line 123 to be expanded upward and downward, and includes a first colored member (not shown) and a second colored member (not shown) which are disposed along the first light blocking member which covers a region in which the first thin film transistor Qh, the second thin film transistor Ql, and the third thin film transistor Qc are disposed and the second light blocking member which extends along the data line 171.

The colored members 320a compensate for a difference in height between the light blocking member 220 and the color filter 230, uniformly control a cell gap between the liquid crystal layer disposed on the color filter 230 and the liquid crystal layer disposed on the light blocking member 220, and reinforce a prevention role in light leakage of the light blocking member 220. As such, since the colored members 320a compensate for the difference in height between the light blocking member 220 and the color filter 230 and thus the liquid crystal molecules disposed between the light blocking member 220 and the color filter 230 are not accurately controlled by a step between the light blocking member 220 and the color filter 230, it is possible to prevent the generated light leakage of an edge portion of the pixel electrode. Further, since the cell gap on the light blocking member 220 is decreased, an average cell gap is decreased and thus a total amount of the liquid crystal used in the liquid crystal display may be reduced.

A lower alignment layer (not illustrated) is formed on the pixel electrode 191, the exposed upper passivation layer 180q, and the colored members 320a. The lower alignment layer may be a vertical alignment layer.

Next, the upper panel 200 will be described.

A common electrode 270 is formed on an insulation substrate 210. The common electrode 270 has a plurality of cutouts 271a and 271b.

The cutout 271a of the common electrode 270 corresponds to the first subpixel electrode 191h, and the silt 271b corresponds to the second subpixel electrode 191l.

The cutouts 271a and 271b may have a cross shape when viewed from a top of the display panel, and ends of the cutouts 271a and 271b protrude from corresponding edges of the first subpixel electrode 191h and the second subpixel electrode 191l. As such, by forming the ends of the cutouts of the common electrode 270 to protrude from the edges of the pixel electrode, the fringe field stably influences up to the edges of the pixel area and thus the alignment of the liquid crystal molecules may be controlled in a desired direction even in the edges of the pixel area. Further, even though misalignment of the lower panel 100 and the upper panel 200 occurs, the cutouts 271a and 271b of the common electrode 270 may be overlapped with the subpixel electrode 191h and the second subpixel electrode 191l.

Widths of the cutouts 271a and 271b may be substantially same to or smaller than about three times the thickness of the liquid crystal layer 3, the cell gap.

Areas corresponding to the first subpixel electrode 191h and the second subpixel electrode 191l may be divided into a plurality of subregions by the cutouts 271a and 271b and the edges of the first subpixel electrode 191h and the second subpixel electrode 191l.

An upper alignment layer (not illustrated) is formed on the common electrode 270. The upper alignment layer may be a vertical alignment layer.

Polarizers (not illustrated) are provided on outer sides of the two panels 100 and 200, and transmissive axes of the two polarizers are perpendicular to each other and one transmissive axis thereof may be parallel to the gate line 121. However, the polarizer may be disposed only on the outer side of any one of the two panels 100 and 200.

The liquid crystal layer 3 interposed between the lower panel 100 and the upper panel 200 includes liquid crystal molecules 31 having negative dielectric anisotropy.

At least one of the liquid crystal layer 3, the lower alignment layer, and the upper alignment layer may include photoreactive materials. For example, the photoreactive material may be a photopolymerizable material.

The liquid crystal molecules 31 of the liquid crystal layer 3 are aligned so that long axes thereof are vertical to the surfaces of the two panels 100 and 200 while an electric field is not applied. Accordingly, incident light does not pass through an orthogonal polarizer but is blocked while the electric field is not applied.

The liquid crystal molecules 31 may be initially aligned to have a pretilt such that the long axes of the liquid crystal molecules 31 are arranged to be inclined toward a intersecting point of the cross-shaped cutout. Accordingly, each of the first and second subpixel electrodes 191h and 191l has four subregions having different pretilt directions of the liquid crystal molecules 31.

In the case of the liquid crystal display according to the exemplary embodiment, the cross-shaped cutouts are formed on the common electrode, but the cross-shaped cutouts may be formed in at least one of the pixel electrode and the common electrode which are the field generating electrodes. In detail, the cross-shaped cutouts may be formed in the pixel electrode and may be formed in both the pixel electrode and the common electrode.

As describe above, the first subpixel electrode 191h and the second subpixel electrode 191l supplied with the data voltages which generate the electric field together with the common electrode 270 of the common electrode panel 200, and as a result, the liquid crystal molecules of the liquid crystal layer 3 which are aligned so as to be vertical to the surfaces of the two electrodes 191 and 270 while the electric field is not applied are tilted in a horizontal direction to the surfaces of the two electrodes 191 and 270 and luminance of light passing through the liquid crystal layer 3 varies according to the tilted degree of the liquid crystal molecules.

According to another exemplary embodiment of the present invention, the liquid crystal display may further include a spacer 325 for maintaining a cell gap between two panels 100 and 200, and the spacer 325 may be formed on the same layer as the colored members 320a at the same time.

Then, referring back to FIG. 1, a driving method of the liquid crystal display according to the exemplary embodiment of the present invention will be described.

As described above, the first switching element Qh and the second switching element Ql are three-terminal elements such as a thin film transistor, and control terminals thereof are connected to the gate line 121, input terminals are connected to the data line 171, an output terminal of the first switching element Qh is connected to the first subpixel electrode 191h, and an output terminal of the second switching element Ql is connected to the second subpixel electrode 191l and the input terminal of the third switching element Qc.

The third switching element Qc is also a three-terminal element such as a thin film transistor, and a control terminal thereof is connected to the step-down gate line 123, an input terminal is connected to the output terminal of the second switching element Ql connected with the second subpixel electrode 191l, and an output terminal is connected to the step-down capacitor Cstd.

When a gate-on signal is applied to the gate line 121, the first switching element Qh and the second switching element Ql which are connected to the gate line 121 are turned on. As a result, the data voltage applied to the data line 171 is applied to the first subpixel electrode 191h and the second subpixel electrode 191l through the turned-on first switching element Qh and second switching element Ql. In this case, magnitudes of the data voltages applied to the first subpixel electrode 191h and the second subpixel electrode 191l are the same as each other. Accordingly, the charged voltages in the first liquid crystal capacitor and the second liquid crystal capacitor are the same as each other. Next, when a gate-off signal is applied to the gate line 121 and the gate-on signal is applied to the step-down gate line 123, the first switching element Qh and the second switching element Ql are turned off and the third switching element Qc is turned on. Then, charges move to the step-down capacitor Cstd from the second subpixel electrode 191l through the third switching element Qc. Then, the charged voltage of the second liquid crystal capacitor Clcl is decreased, and the step-down capacitor Cstd is charged. Since the charged voltage of the second liquid crystal capacitor Clcl is decreased by capacitance of the step-down capacitor Cstd, the charged voltage of the second liquid crystal capacitor Clcl is lower than the charged voltage of the first liquid crystal capacitor Clch.

In this case, the sub-pixels having different crystal capacitors Clch and Clcl represent different gamma curves. The gamma curve of the pixel becomes a combined gamma curves of the two sub-pixels. A combined gamma curve at the side becomes closest to the reference gamma curve at the front. As such, side visibility is improved by converting image data.

In the illustrated exemplary embodiment, in order to differ the voltage charged in the first liquid crystal capacitor from the voltage charged in the second liquid crystal capacitor, the output terminal of the second switching element Ql connected to the second subpixel electrode 191l configuring the second liquid crystal capacitor and the third switching element Qc connected to the step-down capacitor Cstd are included. However, in a liquid crystal display according to another exemplary embodiment of the present invention, the third switching element Qc for connecting the second liquid crystal capacitor to a reference divided voltage line may be included. In detail, the second liquid crystal capacitor includes a third switching element including a first terminal connected to the gate line 121 such as the first switching element Qh and the second switching element Ql, a second terminal connected to the second subpixel electrode 191l configuring the second liquid crystal capacitor, and a third terminal connected to a divided voltage capacitor overlapped with the reference divided voltage line, and as a result, a part of the voltage charged in the second liquid crystal capacitor is divided into the divided voltage capacitor and thus the voltage charged in the second liquid crystal capacitor is decreased due to a difference between a common voltage and the reference divided voltage. By the above method, the charged voltage between the first liquid crystal capacitor and the second liquid crystal capacitor may be differently set. Further, in a liquid crystal display according to another exemplary embodiment of the present invention, the first liquid crystal capacitor and the second liquid crystal capacitor are connected to different data lines, respectively and receive different data voltages, and as a result, the charged voltage between the first liquid crystal capacitor and the second liquid crystal capacitor may be differently set. In addition, by various different methods, the charged voltage between the first liquid crystal capacitor and the second liquid crystal capacitor may be differently set. Differentiation of the voltage charged in the first liquid crystal capacitor from the voltage charged in the second liquid crystal capacitor is not limited to the method described above. Applying different voltage from different data lines to the first sub-pixel and the second sub-pixel, respectively, may be used. Common voltage swing which change common voltage level of the first sub-pixel and the second sub-pixel to have different voltage may be used too.

Figure 3:
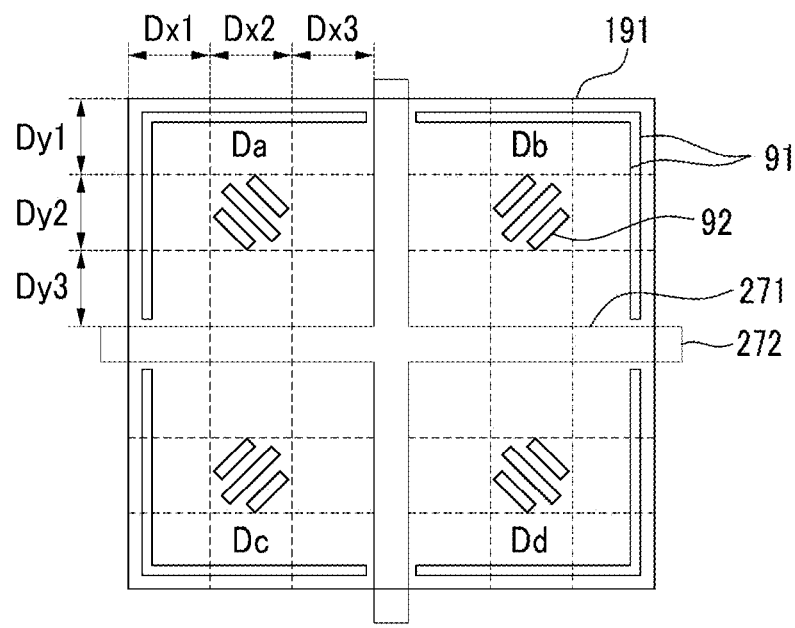
FIG. 3 is a plan view illustrating a basic region of a field generating electrode of the liquid crystal display according to the exemplary embodiment of the present invention.

A basic area of a field generating electrode of the liquid crystal display according to the exemplary embodiment of the present invention will be described with reference to FIG. 3. FIG. 3 is a plan view illustrating a basic area of a field generating electrode of the liquid crystal display according to the exemplary embodiment of the present invention.

As illustrated in FIG. 3, a basic area of the field generating electrode includes a pixel electrode 191 facing the common electrode 270 having cutout 271, a cutout 91 of the pixel electrode 191 surrounding the cutout 271 of the common electrode 270, and a direction controller 92 formed in the pixel electrode 191.

When the liquid crystal display is viewed from the top, the basic area defined by the cutout 271 of the common electrode 270 and the edge of the pixel electrode 191 may be divided into a plurality of domains Da, Db, Dc, and Dd. The plurality of domains Da, Db, Dc, and Dd may be symmetrical to each other. The cutout 271 of the common electrode 270 may be an axis of symmetry.

As described above, the cutout 271 of the common electrode 270 may have a cross shape when viewed from the top, and an end 272 of the cutout 271 protrudes from an edge of the corresponding pixel electrode 191. A width of the cutout 271 of the common electrode 270 may be about 2 μm to about 10 μm.

The cutout 91 of the pixel electrode 191 is formed in a substantially quadrangular ring shape along the edge of the pixel electrode 191, and has disconnected portion corresponding to the cutout 271 of the common electrode 270. As such, the disconnected portion of the cutout 91 formed on the pixel electrode 191 becomes a connecting portion of an inner portion and an outer portion of the pixel electrode. A width of the connecting portion of the pixel electrode is larger than a width of the cutout 271 of the common electrode 270.

The cutout 91 of the pixel electrode 191 may be disposed at a position substantially same to or smaller than two times the cell gap of the liquid crystal display, and the width of the cutout 91 may be substantially same to or smaller than two times the cell gap of the liquid crystal display.

The cutout 91 of the pixel electrode 191 may control tilt directions of the directors of the liquid crystal molecules disposed at the edge of the pixel electrode 191 by a fringe field.

The width of the cross-shaped cutout 271 may be substantially same to or smaller than about three times the thickness of the liquid crystal layer 3, the cell gap.

The direction controller 92 of the pixel electrode 191 is disposed at the central portion of each of the domains Da, Db, Dc, and Dd. In more detail, when each of the domains Da, Db, Dc, and Dd is divided into nine small regions by dividing a width of each of the domains Da, Db, Dc, and Dd into three equal parts Dx1, Dx2, and Dx3 and dividing a length thereof into three equal parts Dy1, Dy2, and Dy3, the direction controller 92 of the pixel electrode 191 is disposed in a region corresponding to the central portion positioned in a second row and a second column (Dx2, Dy2) among the nine small regions of each of the domains Da, Db, Dc, and Dd.

The data voltage is applied to the pixel electrode 191 and the common voltage is applied to the common electrode 270 to generate an electric field in the liquid crystal layer 3 between two panels 100 and 200. Then, the liquid crystal molecules 31 of the liquid crystal layer 3 are tilted such that the long axes of the liquid crystal molecules 31 are arranged to be parallel to a line connecting the intersecting point of the cross-shaped cutout and a pixel corner edge opposing the intersecting point by a fringe field due to the cutout 271 of the common electrode 270 and the edge of the pixel electrode 191, in response to the electric field. In addition, tilt directions of the liquid crystal molecules 31 in one basic area of the field generating electrode becomes a total of four. That is, the tilt directions of the liquid crystal molecules 31 in each of the domains Da, Db, Dc, and Dd are different from each other.

The direction controller 92 of the pixel electrode 191 extends in a parallel direction to the tilt directions of the liquid crystal molecules 31 in each of the domains Da, Db, Dc, and Dd.

The direction controller 92 may be the cutout formed in the pixel electrode 191, or concave portions or convex portions on the surface of the pixel electrode. The concave portions or convex portions on the surface of the pixel electrode may be formed by concave or convex portions in an insulating layer under the pixel electrode. The direction controller 92 may prevent irregular movement of the liquid crystal molecules which may occur in the central portion of the domain by additionally controlling the tilt directions of the directors of the liquid crystal molecules in the central portion of each domain, more particularly, azimuthal angles which are directions of the directors of the liquid crystal molecules, thereby preventing deterioration of display quality such as a texture due to the irregular movement of the liquid crystal molecules or deterioration of transmittance. The width of the direction controller may be 3 µm, the distance between the direction controllers may be 3 µm and the depth of the direction controller may be the same as the thickness of the pixel electrode.

In the case of the liquid crystal display according to the exemplary embodiment, the cross-shaped cutout is formed in the common electrode, but may be formed in at least one of the pixel electrode and the common electrode. In detail, the cross-shaped cutout may be formed in the pixel electrode and may be formed in both the pixel electrode and the common electrode.

Figure 4:
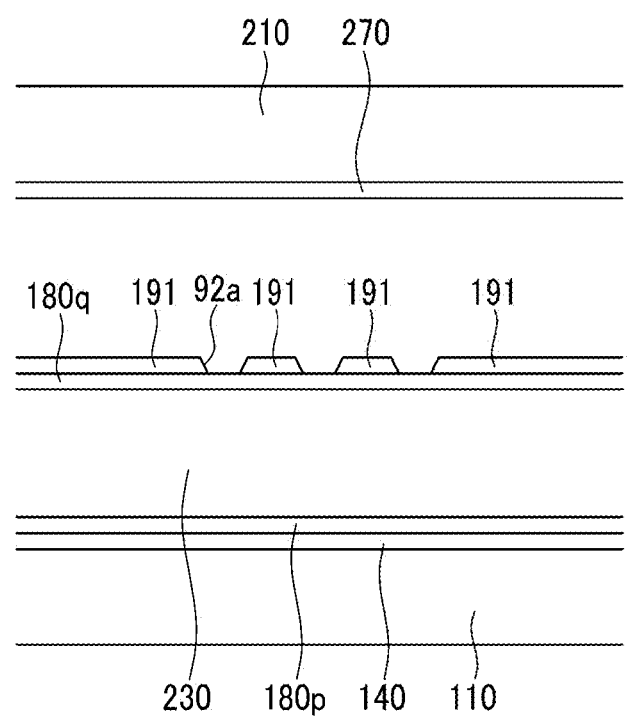
FIG. 4 is a cross-sectional view of the liquid crystal display of FIG. 1 taken along line IV-IV.

The direction controller 92 of the pixel electrode 191 will be described with reference to FIGS. 4 to 6. FIG. 4 is a cross-sectional view of the liquid crystal display of FIG. 1 taken along line IV-IV, FIG. 5 is a cross-sectional view illustrating a part of a liquid crystal display device according to another exemplary embodiment of the present invention, and FIG. 6 is a cross-sectional view illustrating a part of the liquid crystal display device according to another exemplary embodiment of the present invention.

First, referring to FIG. 4, the direction controller 92a of the pixel electrode 191 is a cutout formed in the pixel electrode 191. As such, the tilt directions of the directors of the liquid crystal molecules is additionally controlled in the central portion of each domain by the cutout of the pixel electrode 191, in a plurality of domains corresponding to the pixel electrode 191. Accordingly, it is possible to prevent deterioration of display quality such as a texture due to irregular movement of the liquid crystal molecules or deterioration of transmittance by preventing irregular movement of the liquid crystal molecules which may occur in the central portion of the domain.

Figure 5:
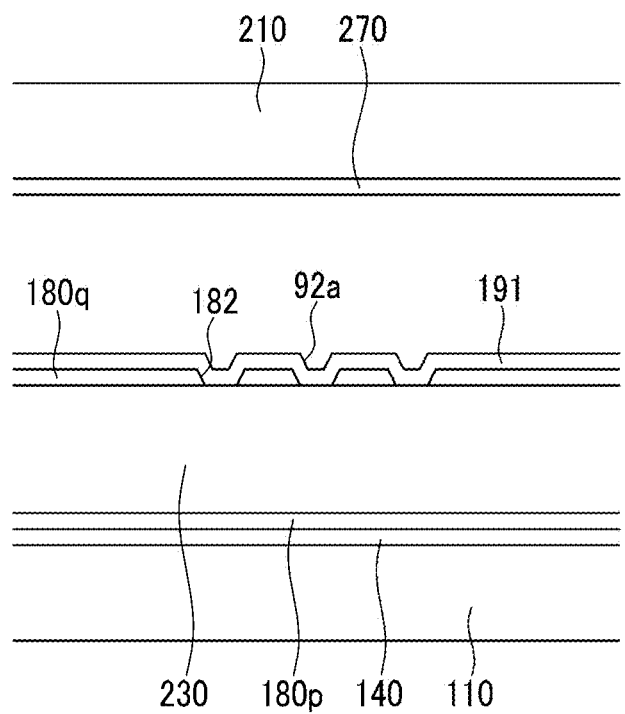
FIG. 5 is a cross-sectional view illustrating a part of a liquid crystal display device according to another exemplary embodiment of the present invention.
Figure 6:
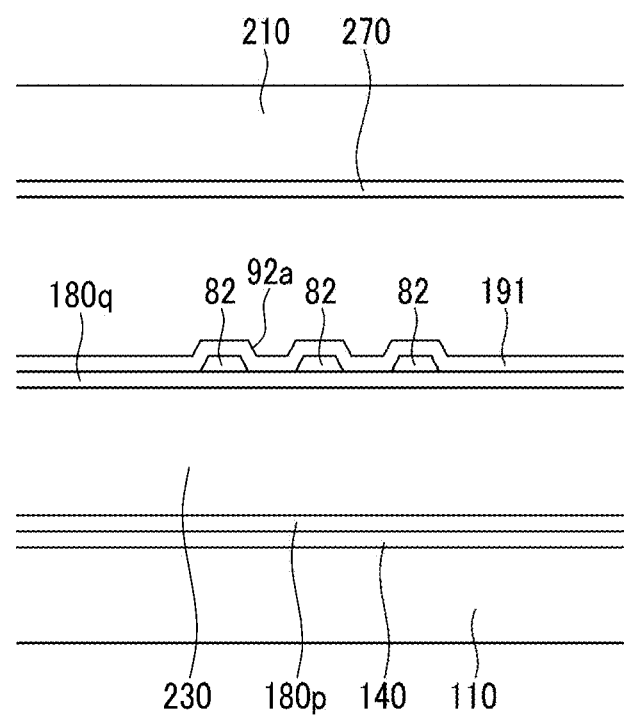
FIG. 6 is a cross-sectional view illustrating a part of the liquid crystal display device according to another exemplary embodiment of the present invention.

Next, referring to FIG. 5, the direction controller 92a of the pixel electrode 191 is a concave portion of the pixel electrode 191. The concave portion configuring the first direction controller 92a of the pixel electrode 191 may be formed by forming openings in the upper passivation layer 180q disposed below the pixel electrode 191 and then forming the pixel electrode 191 thereon. However, in order to form the concave portion of the pixel electrode 191, an additional insulating layer instead of the upper passivation layer 180q is formed and the openings may be formed in the additional insulating layer. The width of the opening in the upper passivation layer 180q may be wider than the target width of the concave portion on the pixel electrode.

As such, in a plurality of domains corresponding to the pixel electrode 191, the tilt directions of the directors of the liquid crystal molecules are additionally controlled in the central portion of each domain by the concave portion of the surface of the pixel electrode 191. Accordingly, it is possible to prevent deterioration of display quality such as a texture due to irregular movement of the liquid crystal molecules or deterioration of transmittance by preventing irregular movement of the liquid crystal molecules which may occur in the central portion of the domain.

Next, referring to FIG. 6, the direction controller 92a of the pixel electrode 191 is a convex portion of the pixel electrode 191. The convex portion configuring the first direction controller 92a of the pixel electrode 191 may be formed by forming an insulation convex pattern 82 below the pixel electrode 191 and then forming the pixel electrode 191 thereon. However, in order to form the convex portion of the pixel electrode 191, an additional convex pattern 82 is not formed, but a convex pattern may be formed by forming a thickness difference in the upper passivation layer 180q disposed under the pixel electrode 191. The distance between the convex portions may be wider than the target width of the concave portion on the pixel electrode.

As such, in a plurality of domains corresponding to the pixel electrode 191, the tilt directions of the directors of the liquid crystal molecules are additionally controlled in the central portion of each domain by the convex portion on the surface of the pixel electrode 191. Accordingly, it is possible to prevent deterioration of display quality such as a texture due to irregular movement of the liquid crystal molecules or deterioration of transmittance by preventing irregular movement of the liquid crystal molecules which may occur in the central portion of the domain.

Figure 7:
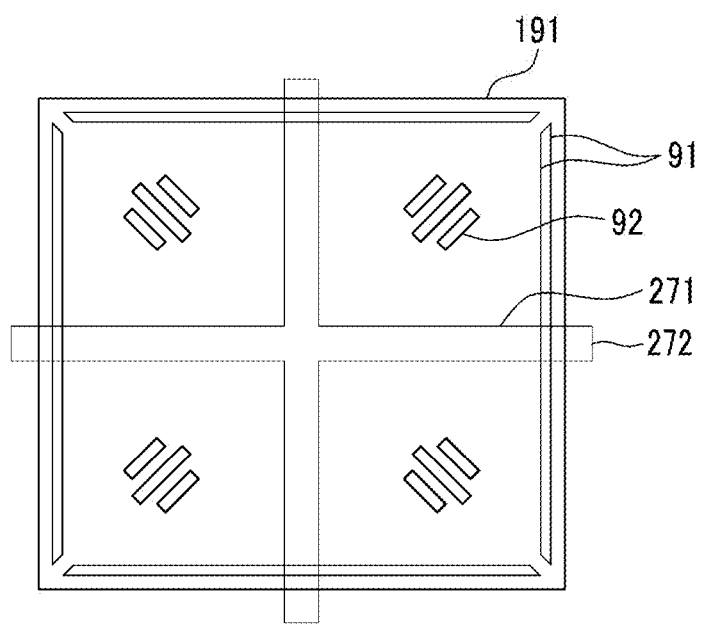
FIG. 7 is a plan view illustrating a basic area of a field generating electrode of the liquid crystal display according to another exemplary embodiment of the present invention.

Then, a basic area of a field generating electrode of the liquid crystal display according to the exemplary embodiment of the present invention will be described with reference to FIG. 7. FIG. 7 is a plan view illustrating a basic area of a field generating electrode of a liquid crystal display according to another exemplary embodiment of the present invention.

Referring to FIG. 7, the basic area of the field generating electrode of the liquid crystal display according to the exemplary embodiment is almost similar to the basic area of the field generating electrode of the liquid crystal display according to the exemplary embodiment illustrated in FIG. 3.

As illustrated in FIG. 7, the basic area of the field generating electrode includes a pixel electrode 191 corresponding to the cutout 271 of the common electrode 270, a cutout 91 of the pixel electrode 191 surrounding the cutout 271 of the common electrode 270, and a direction controller 92 of the pixel electrode 191. When the liquid crystal display is viewed from the top, the basic area defined by the cutout 271 of the common electrode 270 and the edge of the pixel electrode 191 may be divided into a plurality of domains Da, Db, Dc, and Dd, and the plurality of domains Da, Db, Dc, and Dd may be symmetrical to each other. The cutout 271 of the common electrode 270 may be an axis of symmetry.

The cutout 91 of the pixel electrode 191 is formed in a substantially quadrangular ring shape along the edge of the pixel electrode 191, and is disconnected at four portions where two edges of the pixel electrode 191 extending in different directions meet each other, that is, at the portions adjacent to the corner portions of the pixel electrode 191. As such, the disconnected portion of the cutout 91 formed on the pixel electrode 191 becomes a connecting portion of an inner portion and an outer portion of the pixel electrode. Unlike the exemplary embodiment illustrated in FIG. 3 described above, the cutout 91 of the pixel electrode 191 is partially overlapped with the cutout 271 of the common electrode 270. The cutout 91 of the pixel electrode 191 may have disconnected portion corresponding to the cutout 271 of the common electrode 270 too.

The direction controller 92 of the pixel electrode 191 is disposed at the central portion of each of the domains Da, Db, Dc, and Dd. In more detail, when each of the domains Da, Db, Dc, and Dd is divided into nine small regions by dividing a width and a length of each of the domains Da, Db, Dc, and Dd into three equal parts, the direction controller 92 of the pixel electrode 191 is disposed in a region corresponding to the central portion positioned in a second row and a second column among the nine small regions of each of the domains Da, Db, Dc, and Dd.

The direction controller 92 of the pixel electrode 191 extends in a parallel direction to the tilt directions of the liquid crystal molecules 31 in each of the domains Da, Db, Dc, and Dd.

The direction controller 92 may be the cutout formed in the pixel electrode 191, or a concave portion or a convex portion of the surface of the pixel electrode. The concave portions or convex portions on the surface of the pixel electrode may be formed by concave or convex portions in an insulating layer under the pixel electrode. The direction controller 92 may prevent irregular movement of the liquid crystal molecules which may occur in the central portion of the domain by additionally controlling the tilt directions of the directors of the liquid crystal molecules in the central portion of each domain, more particularly, azimuthal angles which are directions of the directors of the liquid crystal molecules, thereby preventing deterioration of display quality such as a texture due to the irregular movement of the liquid crystal molecules or deterioration of transmittance. The width of the direction controller may be ( )μm, the distance between the direction controllers may be ( )μm and the depth of the direction controller may be ( )μm.

In the case of the liquid crystal display according to the exemplary embodiment, the cross-shaped cutout is formed in the common electrode, but may be formed in at least one of the pixel electrode and the common electrode which are the field generating electrodes. In detail, the cross-shaped cutout may be formed in the pixel electrode and may be formed in both the pixel electrode and the common electrode.

Figure 8:
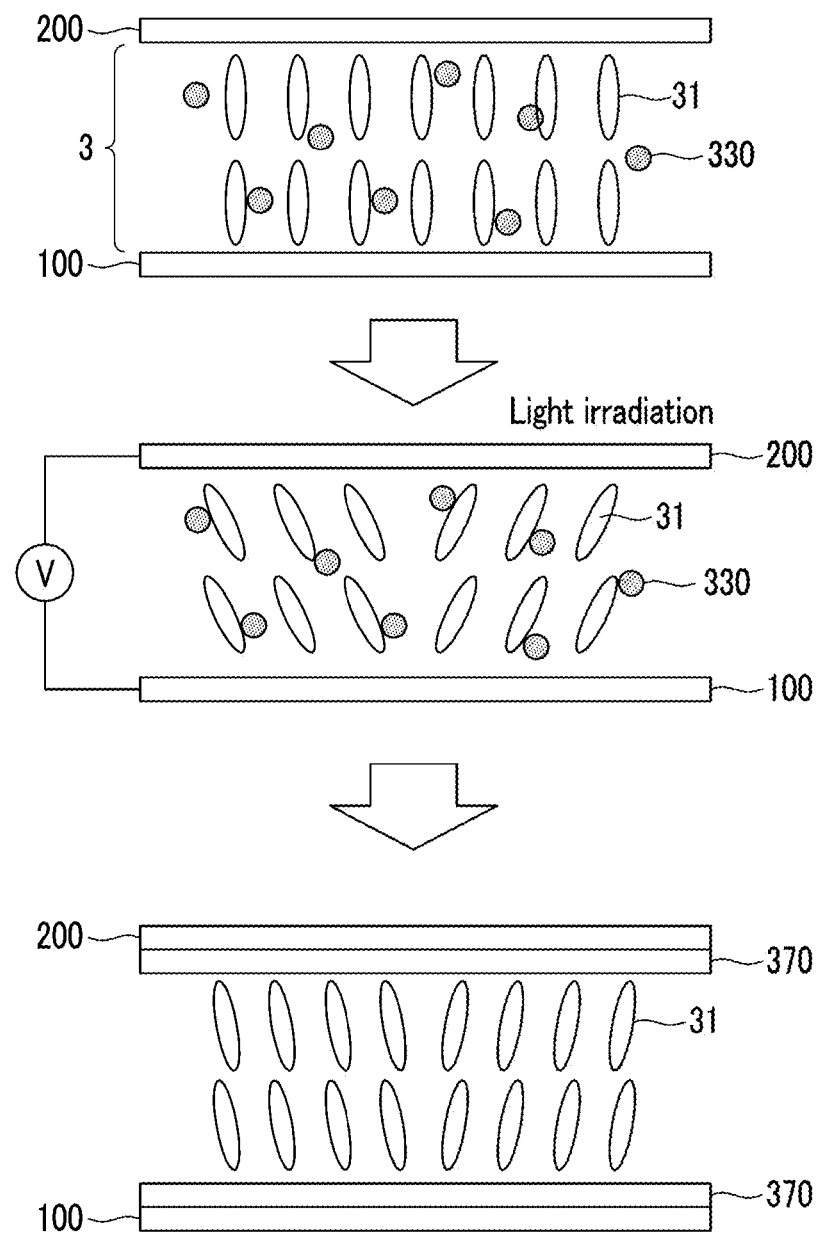
FIG. 8 is a diagram illustrating a process that liquid crystal molecules have pretilts by using prepolymers polymerized by light such as ultraviolet light.
Figure 9:
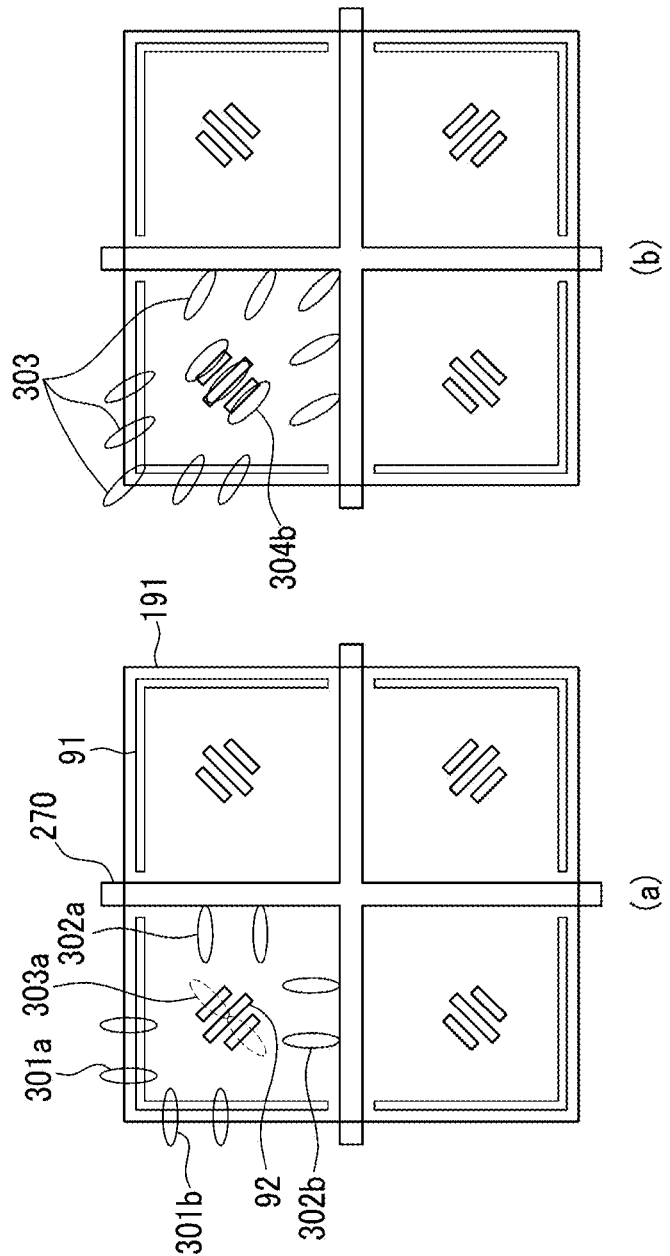
FIG. 9 is a schematic view illustrating alignment directions of directors of the liquid crystal molecules of the liquid crystal display according to the exemplary embodiment of the present invention.

Then, a method of initially aligning the liquid crystal molecules 31 to have pretilts will be described with reference to FIGS. 8 and 9. FIG. 8 is a diagram illustrating a process of forming liquid crystal molecules have pretilts by using prepolymers polymerized by light such as ultraviolet light, and FIG. 9 is a schematic view illustrating alignment directions of directors of the liquid crystal molecules of the liquid crystal display according to the exemplary embodiment of the present invention.

First, a prepolymer 330 such as monomers curable by polymerization by light such as ultraviolet rays is injected between the two panels 100 and 200 together with a liquid crystal material. In this case, the prepolymer 330 may be included in the liquid crystal layer, alignment layers (not illustrated) formed on the two panels 100 and 200, and both of the liquid crystal layer and the alignment layers. The prepolymer 330 may be reactive mesogen polymerizable by the light such as ultraviolet rays.

Next, data voltages are applied to the first and the second subpixel electrodes 191h and 191l and a common voltage is applied to the common electrode 270 of the upper panel 200 to generate an electric field in the liquid crystal layer 3 between the two panels 100 and 200. Then, the liquid crystal molecules 31 of the liquid crystal layer 3 are tilted such that the long axes of the liquid crystal molecules 31 are arranged to be parallel to a line connecting the intersecting point of the cross-shaped cutout and a pixel edge opposing the intersecting point by a fringe field due to the cutout 271 of the common electrode 270 and the edge of the pixel electrode 191, in response to the electric field. In addition, tilt directions of the liquid crystal molecules 31 in one basic area of the field generating electrode becomes a total of four.

Referring to FIG. 9A, directors 301a and 301b of the liquid crystal molecules in the portion adjacent to the edges of the pixel electrode 191 of the basic area of the field generating electrode is substantially vertical to the edges of the pixel electrode 191. Further, directors 302a and 302b of the liquid crystal molecules in the portion adjacent to the edges of the cutout 271 of the common electrode of the basic area of the field generating electrode is substantially vertical to the edges of the cutout 271 of the common electrode 270.

As such, the liquid crystal directors are determined according to the fringe field generated by the edge of the pixel electrode 191, the cutout 91 of the pixel electrode 191, and the cutout 271 of the common electrode. The liquid crystal directors are secondly arranged in a direction for allowing the liquid crystal molecules to meet each other to minimize deformation. The secondary alignment direction becomes a vector sum direction of the directions of the respective directors.

Therefore, finally, as illustrated in FIG. 9B, a liquid crystal director 304b is arranged to be parallel to a line connecting the intersecting point of the cross-shaped cutout and a pixel corner edge opposing the intersecting point.

In this case, the cutout 91 of the pixel electrode 191 helps many liquid crystal molecules be secondly aligned even in the portion adjacent to the edge of the pixel electrode 191 like the liquid crystal director 304b of FIG. 9B, by controlling a magnitude of the fringe field applied to the edges of the pixel electrode 191 and decreasing the number of liquid crystal molecules having the directors 301a and 301b which are vertical to the edges of the pixel electrode 191 in the portion adjacent to the edges of the pixel electrode 191. As a result, it is possible to prevent deterioration of display quality by preventing the liquid crystal molecules in the edges of the pixel electrode from being tilted in the direction vertical to the edges of the pixel electrode. In detail, the directors of the liquid crystal molecules may be tilted and aligned so as to form a predetermined angle with the edges of the pixel electrode 191, not the direction vertical to the edges of the pixel electrode 191, when viewed from the top.

Further, the directors 303a of the liquid crystal molecules disposed around the direction controller 92 of the pixel electrode 191 collide with each other while facing the direction vertical to a length direction of the direction controller 92, and as a result, the directors 304b of the liquid crystal molecules are aligned in the length direction of the direction controller 92. Accordingly, the direction controller 92 of the pixel electrode 191 may additionally control the tilt directions of the directors of the liquid crystal molecules in the central portion of each domain, more particularly, the azimuthal directions which are the directions of the directors of the liquid crystal molecules.

Accordingly, the directors of the liquid crystal molecules 31 are similarly aligned in each of the subregions Da, Db, Dc, and Dd, and the tilt directions of the liquid crystal molecules become a total of four in each basic area of the field generating electrode.

In detail, in a first region among the respective subregions, the directors of the liquid crystal molecules 31 are obliquely aligned in a lower right direction toward the central portion of the cutout 271 from the edges of the pixel electrode, and in a second region, the directors of the liquid crystal molecules 31 are obliquely aligned in a lower left direction toward the central portion of the cutout 271 from the edges of the pixel electrode. In addition, in a third region, the directors of the liquid crystal molecules 31 are obliquely aligned in an upper right direction toward the central portion of the cutout 271 from the edges of the pixel electrode, and in a fourth region, the directors of the liquid crystal molecules 31 are obliquely aligned in an upper left direction toward the central portion of the cutout 271 from the edges of the pixel electrode.

As such, while the liquid crystal molecules of the liquid crystal layer 3 are aligned, when light such as ultraviolet rays is irradiated, the prepolymer 330 is polymerized to form a polymer 370.

If the prepolymer 330 is included in the alignment layer, the prepolymer of the alignment layer is polymerized and thus the polymer 370 is formed in the alignment layer. The alignment direction of the liquid crystal molecules 31 is determined by the polymer 370 so as to have pretilts in the direction described above. Accordingly, even in a state where the voltages are not applied to the field generating electrodes 191 and 270, the liquid crystal molecules 31 are aligned so as to have pretilts in four different directions.

Figure 10:
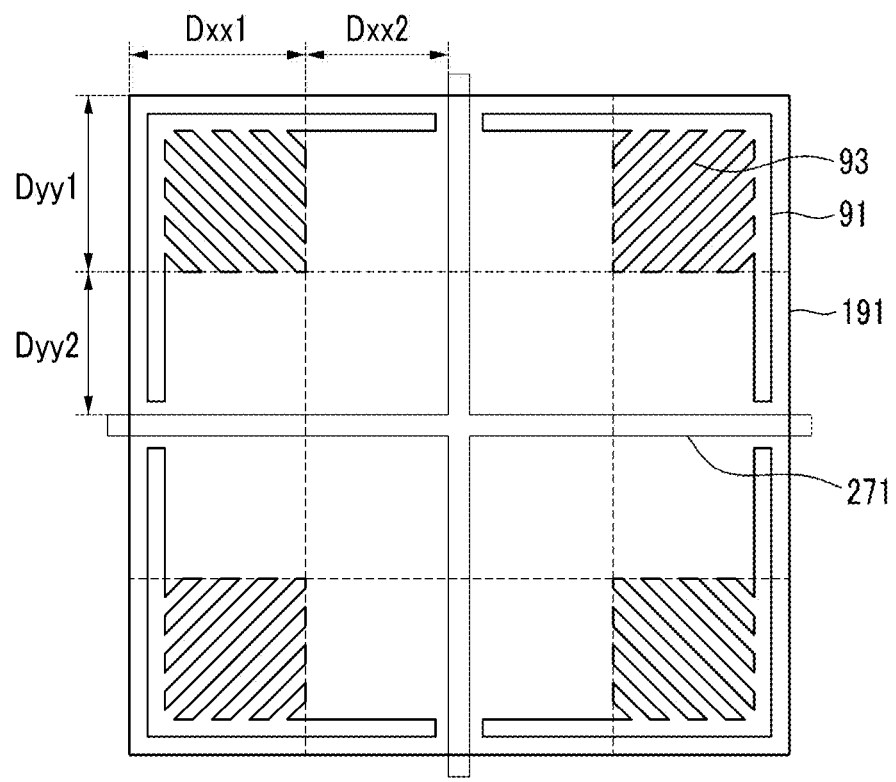
FIG. 10 is a plan view illustrating a basic area of a field generating electrode of the liquid crystal display according to another exemplary embodiment of the present invention.

Then, a basic area of a field generating electrode of the liquid crystal display according to another exemplary embodiment of the present invention will be described with reference to FIG. 10. FIG. 10 is a plan view illustrating a basic area of a field generating electrode of a liquid crystal display according to another exemplary embodiment of the present invention.

Referring to FIG. 10, the basic area of the field generating electrode includes a pixel electrode 191 facing the common electrode 270 having the cutout 271, a cutout 91 of the pixel electrode 191 surrounding the cutout 271 of the common electrode 270, and a minute cutout 93 formed on the pixel electrode 191.

When the liquid crystal display is viewed from the top, the basic area defined by the cutout 271 of the common electrode 270 and the edge of the pixel electrode 191 may be divided into a plurality of domains Da, Db, Dc, and Dd, and the plurality of domains Da, Db, Dc, and Dd may be symmetrical to each other. The cutout 271 of the common electrode 270 may be an axis of symmetry.

As described above, the cutout 271 of the common electrode 270 may have a cross shape when viewed from the top, and an end 272 of the cutout 271 protrudes from an edge of the corresponding pixel electrode 191. A width of the cutout 271 of the common electrode 270 may be about 2 µm to about 10 µm.

The cutout 91 of the pixel electrode 191 is formed in a substantially quadrangular ring shape along the edge of the pixel electrode 191, and has disconnected portion corresponding to the cutout 271 of the common electrode 270. As such, the disconnected portion of the cutout 91 formed on the pixel electrode 191 becomes a connecting portion of the pixel electrode. A width of the connecting portion of an inner portion and an outer portion of the pixel electrode is larger than a width of the cutout 271 of the corresponding common electrode 270.

The cutout 91 of the pixel electrode 191 may be disposed at a position substantially same to or smaller than two times the cell gap of the liquid crystal display, and the width of the cutout 91 may be substantially same to or smaller than two times the cell gap of the liquid crystal display.

The cutout 91 of the pixel electrode 191 may control tilt directions of directors of the liquid crystal molecules disposed at the edge of the pixel electrode 191, more particularly, the azimuthal angles which are the directions of the directors of the liquid crystal molecules, by a fringe field.

The minute cutout 93 of the pixel electrode 191 is a plurality of cutouts extending from the cutout 91 formed along the edge of the pixel electrode 191. The minute cutout 93 extends in a direction parallel to a line connecting the intersecting point of the cross-shaped cutout and a pixel corner edge opposing the intersecting point.

When each of the domains Da, Db, Dc, and Dd is divided into four small regions by dividing a width of each of the domains Da, Db, Dc, and Dd into two equal parts Dxx1 and Dxx2 and dividing a length thereof into two equal parts Dyy1 and Dyy2, the minute cutout 93 is disposed in the entire area adjacent to respective corners where the edges of the pixel electrode extending in different directions meet among the four small regions of each of the domains Da, Db, Dc, and Dd. That is, each of the domains Da, Db, Dc, and Dd is formed throughout the region adjacent to each corner where two edges of the pixel electrode meets among the four small regions.

The data voltage is applied to the pixel electrode 191 and the common voltage is applied to the common electrode 270 to generate an electric field in the liquid crystal layer 3 between the two panels 100 and 200. Then, the liquid crystal molecules 31 of the liquid crystal layer 3 are tilted such that the long axes of the liquid crystal molecules 31 are arranged to be parallel to a line connecting the intersecting point of the cross-shaped cutout and a pixel corner edge opposing the intersecting point. by a fringe field due to the cutout 271 of the common electrode 270 and the edge of the pixel electrode 191, in response to the electric field. In addition, tilt directions of the liquid crystal molecules 31 in one basic area of the field generating electrode becomes a total of four. That is, the tilt directions of the liquid crystal molecules 31 in each of the domains Da, Db, Dc, and Dd are different from each other.

The minute cutout 93 of the pixel electrode 191 is formed to extend in a parallel direction to the tilt directions of the liquid crystal molecules 31 in each of the domains Da, Db, Dc, and Dd. Accordingly, the tilt directions of the liquid crystal molecules are controlled from the corner portion of the pixel electrode 191 to the central portion of each domain. That is, the minute cutout 93 of the pixel electrode 191 may prevent irregular movement of the liquid crystal molecules which may occur in the central portion of the domain by additionally controlling the tilt directions of the directors of the liquid crystal molecules, more particularly, azimuthal angles which are directions of the directors of the liquid crystal molecules, thereby preventing deterioration of display quality such as a texture due to the irregular movement of the liquid crystal molecules or deterioration of transmittance.

In the case of the liquid crystal display according to the exemplary embodiment, the cross-shaped cutout is formed on the common electrode, but may be formed on at least one of the pixel electrode and the common electrode which are the field generating electrodes. In detail, the cross-shaped cutout may be formed on the pixel electrode and may be formed on both the pixel electrode and the common electrode.

Then, results of transmittance of the liquid crystal display according to an Experimental Example of the present invention will be described with reference to FIGS. 11 to 14. FIGS. 11 to 14 are plan views illustrating results of transmittance of the liquid crystal display according to an Experimental Example of the present invention.

Figure 11:
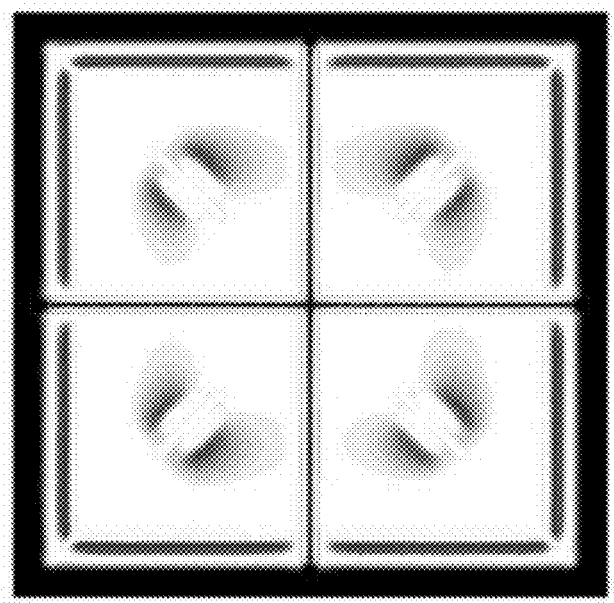
FIGS. 11 to 14 are plan views illustrating results of transmittance of the liquid crystal display according to an Experimental Example of the present invention.
Figure 12:
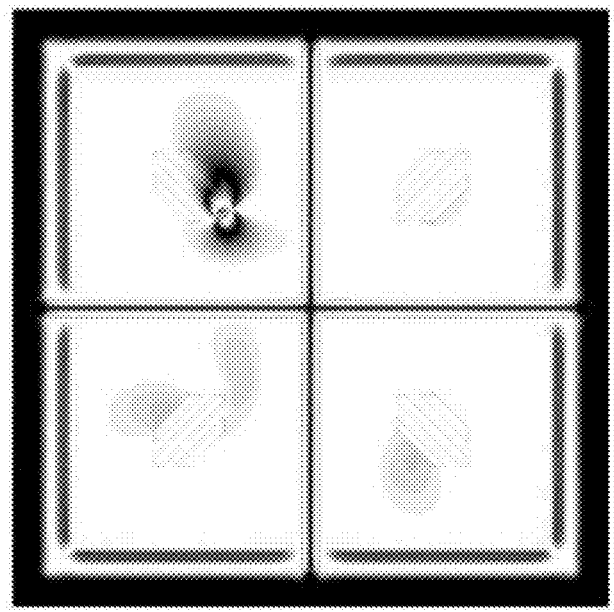
Figure 13:
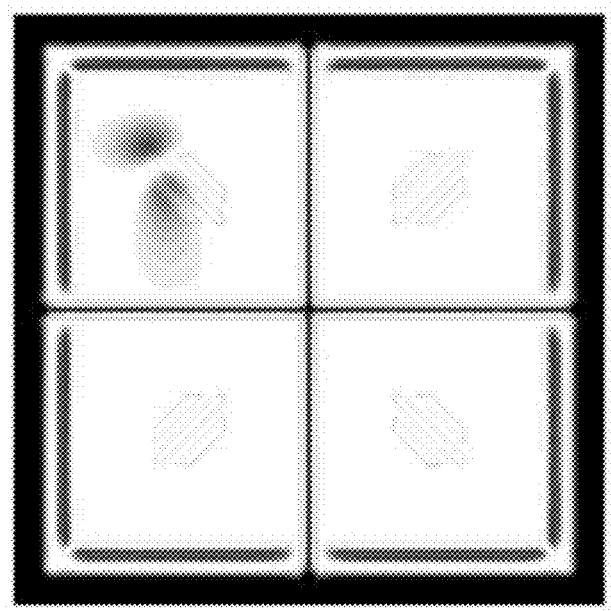
Figure 14:
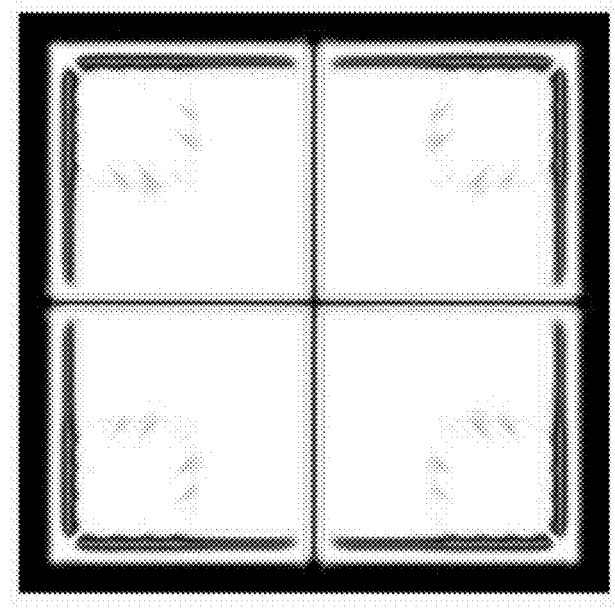

In the Experimental Example, after forming the basic area of the field generating electrode of the liquid crystal display as illustrated in FIG. 3, forming the basic area of the field generating electrode of the liquid crystal display as illustrated in FIG. 10, and then applying the voltage having a predetermined magnitude, as results of transmittance, the basic area of the field generating electrode of the liquid crystal display is illustrated by an electron micrograph. FIG. 11 illustrates a case where the direction controller 92 of the pixel electrode 191 is formed in the basic area of the field generating electrode of the liquid crystal display, and the direction controller 92 is formed by a cutout pattern of the pixel electrode 191, as illustrated in FIGS. 3 and 4. FIG. 12 illustrates a case where the direction controller 92 of the pixel electrode 191 is formed in the basic area of the field generating electrode of the liquid crystal display, and the direction controller 92 is formed by a concave portion on the surface of the pixel electrode 191, as illustrated in FIGS. 3 and 5. FIG. 13 illustrates a case where the direction controller 92 of the pixel electrode 191 is formed in the basic area of the field generating electrode of the liquid crystal display, and the direction controller 92 is formed by a convex portion on the surface of the pixel electrode 191, as illustrated in FIGS. 3 and 6. FIG. 14 illustrates a case where the minute cutout 93 is formed in the basic area of the field generating electrode of the liquid crystal display, as illustrated in FIG. 10. All the other conditions are the same.

Referring to FIGS. 11 to 14, like the liquid crystal displays according to the exemplary embodiments of the present invention, when the basic area of the field generating electrode is formed, the alignment of the liquid crystal molecules is not irregular even in the central portion in each domain, and as a result, deterioration of transmittance even in the central portion in each domain does not occur.

Then, results of transmittance of the liquid crystal display according to another Experimental Example of the present invention will be described with reference to FIGS. 15 to 18. FIGS. 15 to 18 are plan views illustrating results of transmittance of the liquid crystal display according to another Experimental Example of the present invention.

In the Experimental Example, unlike the basic areas of the field generating electrodes of the liquid crystal displays according to the exemplary embodiments described above, in the case where the direction controller 92 or the minute cutout 93 of the pixel electrode 191 is not formed and in the case where the basic area of the field generating electrode of the liquid crystal display is formed as illustrated in FIG. 3 and the basic area of the field generating electrode of the liquid crystal display is formed as illustrated in FIG. 10, after applying a predetermined magnitude of voltage, as results of transmittance, the basic area of the field generating electrode of the liquid crystal display is illustrated by an electron micrograph. In all the cases, the transmittance is measured twice under different conditions.

Figure 15:
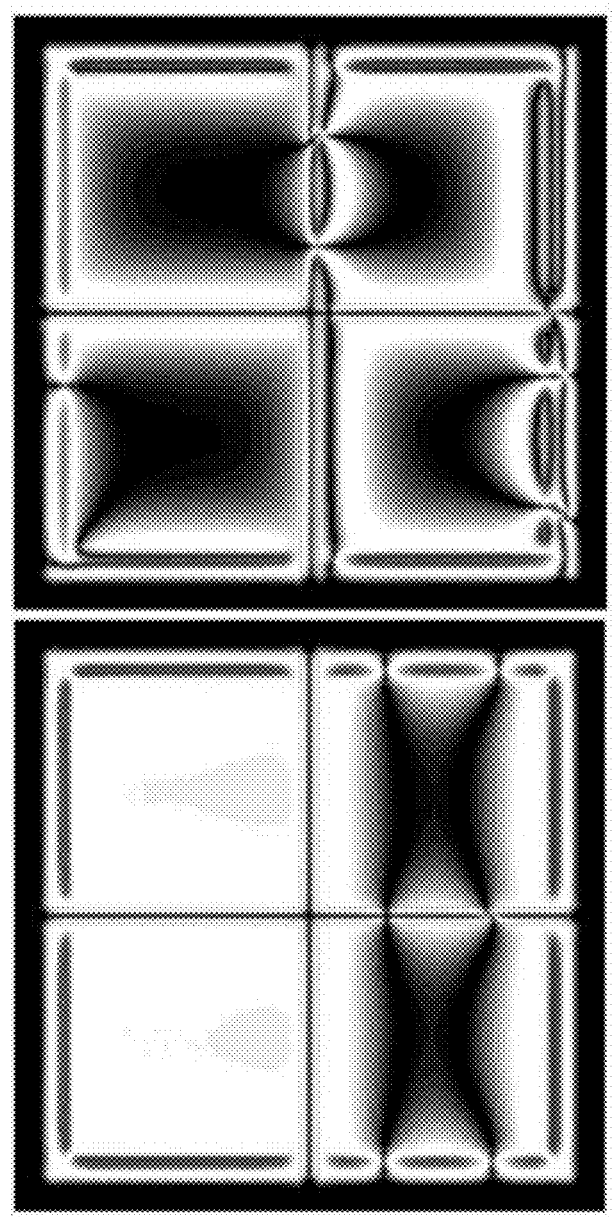
FIGS. 15 to 18 are plan views illustrating results of transmittance of the liquid crystal display according to another Experimental Example of the present invention.
Figure 16:
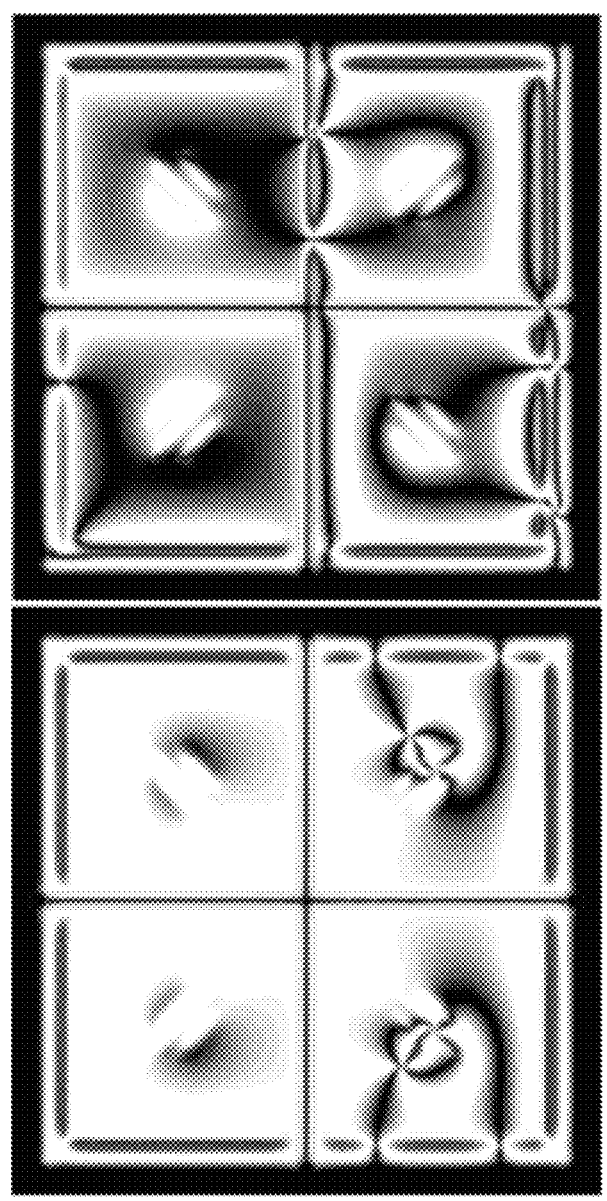
Figure 17:
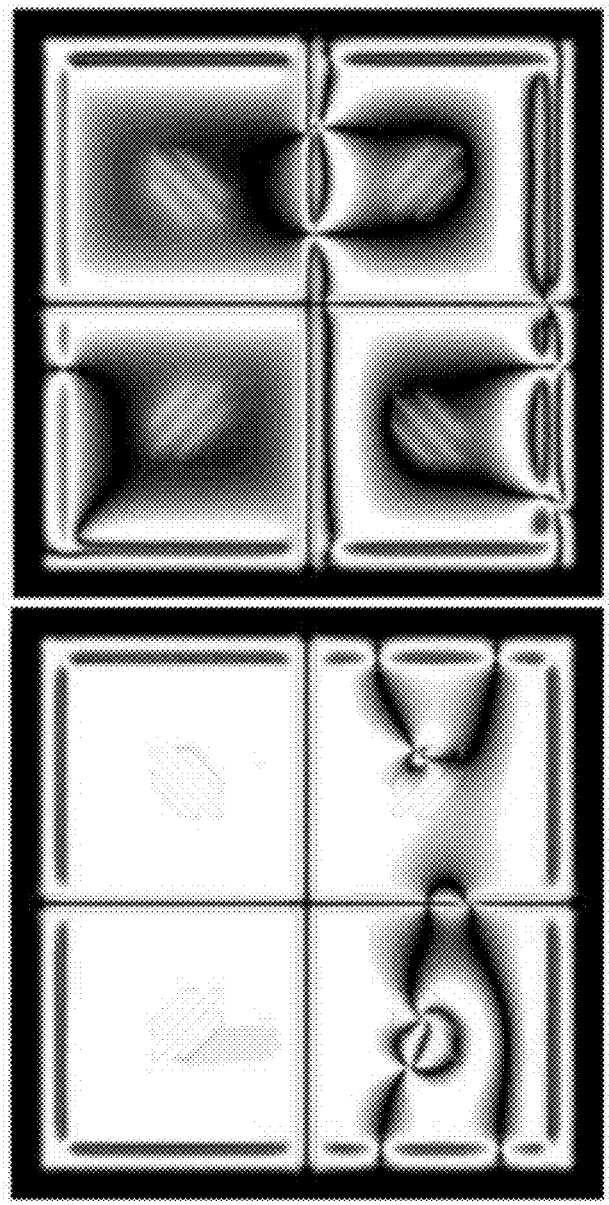
Figure 18:
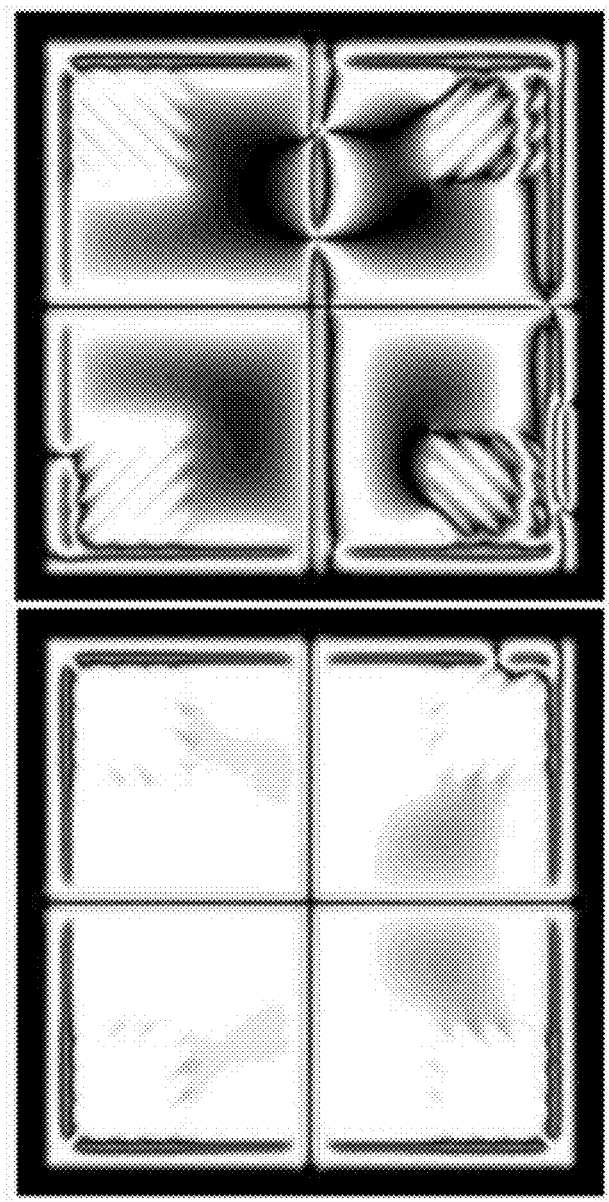

FIG. 15 illustrates the case where the direction controller 92 or the minute cutout 93 of the pixel electrode 191 is not formed, similarly to a liquid crystal display in the related art. FIG. 16 illustrates a case where the direction controller 92 of the pixel electrode 191 is formed in the basic area of the field generating electrode of the liquid crystal display, and the direction controller 92 is formed by a cutout pattern of the pixel electrode 191, as illustrated in FIGS. 3 and 4. FIG. 17 illustrates a case where the direction controller 92 of the pixel electrode 191 is formed in the basic area of the field generating electrode of the liquid crystal display, and the direction controller 92 is formed by a convex portion on the surface of the pixel electrode 191, as illustrated in FIGS. 3 and 6. FIG. 18 illustrates a case where the minute cutout 93 is formed in the basic area of the field generating electrode of the liquid crystal display, as illustrated in FIG. 10. All the other conditions are the same.

Referring to FIG. 15, in the case where the direction controller 92 or the minute cutout 93 of the pixel electrode 191 is not formed, similarly to a liquid crystal display in the related art, irregular movement of the liquid crystal molecules in the central portion of each domain occurs and thus the deterioration of transmittance is large in the central portion of each domain.

Referring to FIGS. 16 to 18 in addition to FIG. 15, similarly to a liquid crystal display in the related art, when comparing the case where the direction controller 92 or the minute cutout 93 of the pixel electrode 191 is not formed, like the liquid crystal displays according to the exemplary embodiments of the present invention, when the basic area of the field generating electrode is formed, the alignment of the liquid crystal molecules is not irregular even in the central portion in each domain, and as a result, the deterioration of transmittance even in the central portion in each domain does not occur.

Figure 20:
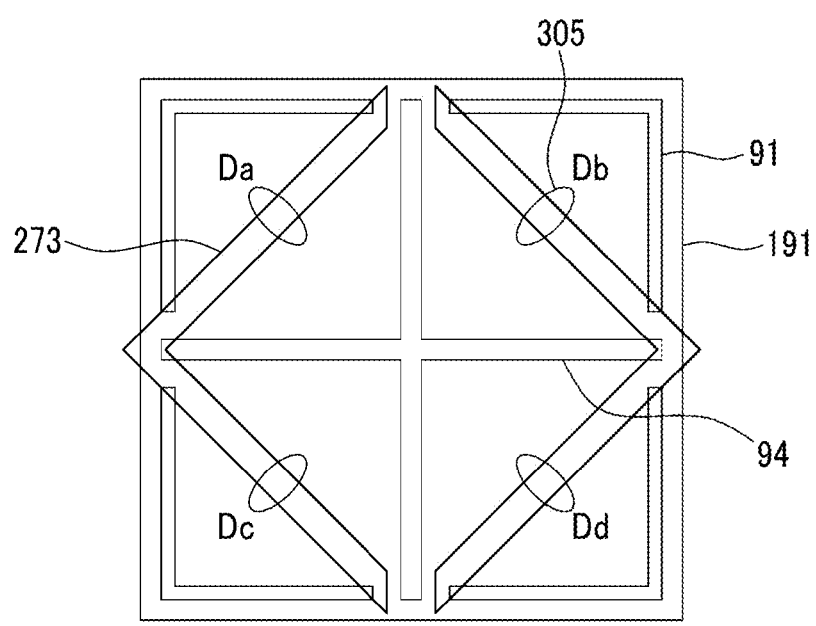
FIG. 20 is a plan view illustrating a basic area of a field generating electrode of the liquid crystal display according to another exemplary embodiment of the present invention.

Then, a liquid crystal display according to another exemplary embodiment of the present invention will be described with reference to FIGS. 19 and 20. FIG. 19 is a plan view illustrating a field generating electrode of the liquid crystal display according to another exemplary embodiment of the present invention, and FIG. 20 is a plan view illustrating a basic area of a field generating electrode of the liquid crystal display according to another exemplary embodiment of the present invention.

A layout and a structure of the liquid crystal display according to the exemplary embodiment are similar to the liquid crystal display according to the exemplary embodiment illustrated in FIGS. 1 and 2. Accordingly, the detailed description is omitted.

Then, a field generating electrode of one pixel area of the liquid crystal display according to the exemplary embodiment of the present invention will be described with reference to FIGS. 19 and 20.

As illustrated in FIG. 19, the pixel electrode 191 of the liquid crystal display according to the exemplary embodiment includes a first subpixel electrode 191*h* and a second subpixel electrode 191*l* which are separated from each other. A cutout 91*a* is formed along an edge of the first subpixel electrode 191*h*, and a cutout 91*b* is formed along an edge of the second subpixel electrode 191*l*.

However, unlike the liquid crystal displays according to the exemplary embodiments described above, in the liquid crystal display according to the exemplary embodiment, the first subpixel electrode 191*h* and the second subpixel electrode 191*l* have cross-shaped cutouts 94*a* and 94*b* when viewed from the top, and the cross-shaped cutout is not formed in the common electrode 270. The cutout 94*a* is formed in the first subpixel electrode 191*h*, and the cutout 94*b* is formed in the second subpixel electrode 191*l*.

Further, the common electrode 270 has cutouts 273*a* and 273*b* extending to have predetermined angles with the cross-shaped cutouts 94*a* and 94*b* of the pixel electrode 191. The cutout 273*a* of the common electrode 270 corresponds to the first subpixel electrode 191*h*, and the cutout 273*b* corresponds to the second subpixel electrode 191*l*.

The first subpixel electrode 191*h* is divided into four subregions by the edges of the first subpixel electrode 191*h* and the cutout 94*a*. The cutout 273*a* of the common electrode 270 includes a first portion corresponding to two subregions positioned at the left among the four subregions of the first subpixel electrode 191*h*, and a second portion corresponding to two subregions positioned at the right among the four subregions of the first subpixel electrode 191*h*, and the first portion and the second portion may be separated from each other. Further, the first portion and the second portion may be symmetrical to each other. A cross-shaped vertical line of the cutout 94*a* of the first subpixel electrode 191*h* may be an axis of symmetry.

The cutout 273*a* of the common electrode 270 may include two diagonal portions inclined at a predetermined angle, for example, about 45 degrees with any one of the cutout directions of a cross-shaped cutout. Further, the diagonal portions may pass through the central portions of the four subregions of the first subpixel electrode 191*h*.

Similarly to this, the second subpixel electrode 191*l* has two regions divided into four subregions by the edges of the second subpixel electrode 191*l* and the cutout 94*b*. That is, the second subpixel electrode 191*l* includes a first region disposed to be adjacent to the first subpixel electrode 191*h* and divided into four subregions, and a second region disposed below the first region and divided into four subregions. The layout of the cutout 94*b* and the cutout 273*b* in the first region and the second region is almost the same as that of the cutout 94*a* and the cutout 273*a* corresponding to the first subpixel electrode 191*h*.

Then, a basic region of a field generating electrode of the liquid crystal display according to the exemplary embodiment will be described with reference to FIG. 20.

As illustrated in FIG. 20, the basic area of the field generating electrode includes a pixel electrode 191 corresponding to the cutout 273 of the common electrode 270, a cross-shaped cutout 94 formed in the pixel electrode 191, a cutout 91 surrounding the cross-shaped cutout 94 and formed along the edge of the pixel electrode 191, and a cutout 273 of the common electrode 270 including a diagonal portion extending to have a predetermined angle with the cross-shaped cutout 94 of the pixel electrode 191.

When the liquid crystal display is viewed from the top, the basic area defined by the cross-shaped cutout 94 of the pixel electrode 191 and the edge of the pixel electrode 191 may be divided into a plurality of domains Da, Db, Dc, and Dd, and the plurality of domains Da, Db, Dc, and Dd may be symmetrical to each other. The cross-shaped cutout 94 of the pixel electrode 191 may be an axis of symmetry.

The cutout 273 formed on the common electrode 270 is not overlapped with the cutout 91 formed along the edge of the pixel electrode 191. However, the cutout 273 formed on the common electrode 270 may be overlapped with the cutout 91 formed along the edge of the pixel electrode 191.

The cutout 91 of the pixel electrode 191 is formed in a substantially quadrangular ring shape along the edge of the pixel electrode 191, and is disconnected around a portion corresponding to an end of the cross-shaped cutout 94 of the pixel electrode 191. As such, the disconnected portion of the cutout 91 formed on the pixel electrode 191 becomes a connecting portion of the pixel electrode.

The cutout 91 of the pixel electrode 191 may control the tilt directions of directors of the liquid crystal molecules disposed at the edge of the pixel electrode 191, more particularly, the azimuthal angles of the directors of the liquid crystal molecules, by controlling an effect of a fringe field.

The data voltage is applied to the pixel electrode 191 and the common voltage is applied to the common electrode 270 to generate an electric field in the liquid crystal layer 3 between the two panels 100 and 200. Then, the liquid crystal molecules 31 of the liquid crystal layer 3 are tilted substantially parallel to a line connecting the intersecting point of the cross-shaped cutout and a pixel corner edge opposing the intersecting point by a fringe field due to the cross-shaped cutout 94 of the pixel electrode 191 and the edge of the pixel electrode 191, in response to the electric field. In addition, tilt directions of the liquid crystal molecules 31 in one basic area of the field generating electrode becomes a total of four. That is, the tilt directions of the liquid crystal molecules 31 in each of the domains Da, Db, Dc, and Dd are different from each other.

The cutout 273 of the common electrode 270 extends in a vertical direction to the alignment directions of the directors of the liquid crystal molecules 31 in the plurality of domains Da, Db, Dc, and Dd. Accordingly, the liquid crystal molecules 31 adjacent to the cutout 273 of the common electrode 270 are tilted in a vertical direction to the extending direction of the cutout 273. The direction of the liquid crystal molecules 31 adjacent to the diagonal portion of the cutout 274 is parallel to the tilt directions of the liquid crystal molecules 31 by the fringe field due to the cross-shaped cutout 94 of the pixel electrode 191 and the edge of the pixel electrode 191. Accordingly, the cutout 273 of the common electrode 270 helps the liquid crystal molecules 31 disposed at the central portion of each domain be tilted in an averagely tilt direction in each domain. As a result, it is possible to prevent irregular movement of the liquid crystal molecules which may occur in the central portion of the domain by additionally controlling the tilt directions of the directors of the liquid crystal molecules in the central portion of each domain of the pixel area, more particularly, azimuthal angles of the directors of the liquid crystal molecules, thereby to prevent deterioration of display quality such as a texture due to the irregular movement of the liquid crystal molecules or deterioration of transmittance.

Figure 22:
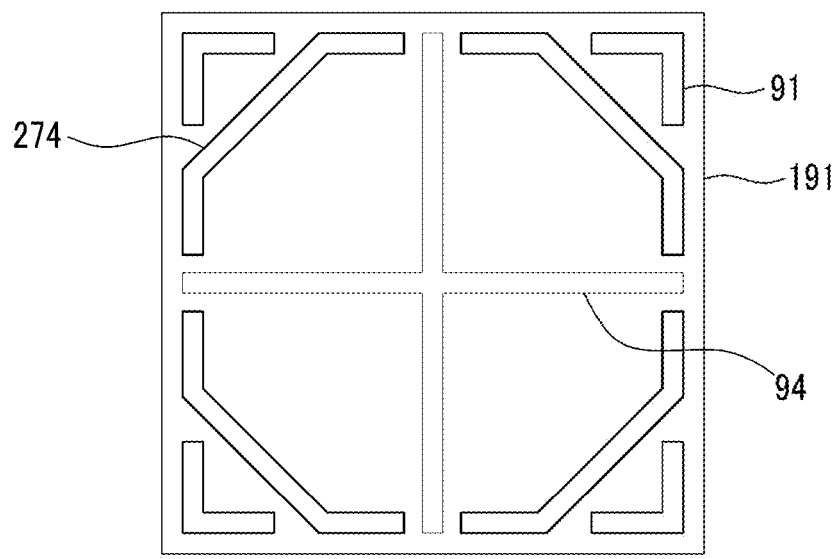
FIG. 22 is a plan view illustrating a basic area of a field generating electrode of the liquid crystal display according to another exemplary embodiment of the present invention.

Then, a liquid crystal display according to another exemplary embodiment of the present invention will be described with reference to FIGS. 21 and 22. FIG. 21 is a plan view illustrating a field generating electrode of the liquid crystal display according to another exemplary embodiment of the present invention, and FIG. 22 is a plan view illustrating a basic area of a field generating electrode of the liquid crystal display according to another exemplary embodiment of the present invention.

A layout and a structure of the liquid crystal display according to the exemplary embodiment are similar to those of the liquid crystal display according to the exemplary embodiment illustrated in FIGS. 1 and 2. Accordingly, the detailed description is omitted.

Then, a field generating electrode of one pixel area of the liquid crystal display according to the exemplary embodiment will be described with reference to FIGS. 21 and 22.

As illustrated in FIG. 21, the pixel electrode of the liquid crystal display according to the exemplary embodiment includes a first subpixel electrode 191*h* and a second subpixel electrode 191*l* which are separated from each other. A cutout 91*a* is formed along an edge of the first subpixel electrode 191*h*, and a cutout 91*b* is formed along an edge of the second subpixel electrode 191I.

However, unlike the liquid crystal displays according to the exemplary embodiments described above, in the liquid crystal display according to the exemplary embodiment, the first subpixel electrode 191*h* and the second subpixel electrode 191*l* have cross-shaped cutouts 94*a* and 94*b* when viewed from the top, and the cross-shaped cutout is not formed in the common electrode 270. The cutout 94*a* of the cross-shaped cutouts 94*a* and 94*b* is formed in the first subpixel electrode 191*h*, and the cutout 94*b* is formed in the second subpixel electrode 191*l*.

Further, the common electrode has cutouts 274*a* and 274*b* including a diagonal portion extending to have predetermined angles with the cross-shaped cutouts 94*a* and 94*b* of the pixel electrode 191 and a straight-line portion connected with the diagonal portion and extending to be parallel to the edge of the pixel electrode 191. The cutout 274*a* of the common electrode corresponds to the first subpixel electrode 191*h*, and the cutout 274*b* corresponds to the second subpixel electrode 191*l*.

The first subpixel electrode 191*h* is divided into four subregions by the edges of the first subpixel electrode 191*h* and the cutout 94*a*. The cutout 274*a* of the common electrode 270 includes a first portion corresponding to two subregions positioned at the left among the four subregions of the first subpixel electrode 191*h*, and a second portion corresponding to two subregions positioned at the right among the four subregions of the first subpixel electrode 191*h*, and the first portion and the second portion may be separated from each other. Further, the first portion and the second portion may be symmetrical to each other based on a cross-shaped vertical line of the cutout 94*a* of the first subpixel electrode 191*h*.

The cutout 274*a* of the common electrode 270 may include two diagonal portions inclined at a predetermined angle, for example, about 45 degrees with the cross-shaped cutout 94*a* of the first subpixel electrode 191*h* and the edges of the first subpixel electrode 191*h* and a straight-line portion connected with the diagonal portion and extending to be parallel to the edges of the pixel electrode 191. Further, the diagonal portions may pass through the portion adjacent to the central portions of the four subregions of the first subpixel electrode 191*h*.

Similarly to this, the second subpixel electrode 191*l* has two regions divided into four subregions by the edges of the second subpixel electrode 191*l* and the cutout 94*b*. That is, the second subpixel electrode 191*l* includes a first region disposed to be adjacent to the first subpixel electrode 191*h* and divided into four subregions, and a second region disposed below the first region and divided into four subregions. The layout of the cutout 94*b* and the cutout 274*b* in the first region and the second region is substantially the same as that of the cutout 94*a* and the cutout 274*a* corresponding to the first subpixel electrode 191*h*.

Then, a basic area of the field generating electrode of the liquid crystal display according to the exemplary embodiment will be described with reference to FIG. 22.

As illustrated in FIG. 22, the basic area of the field generating electrode includes a pixel electrode 191 corresponding to the cutout 271 of the common electrode 270, a cross-shaped cutout 94 formed in the pixel electrode 191, a cutout 91 surrounding the cross-shaped cutout 94 of the pixel electrode 191 and formed along the edge of the pixel electrode 191, and a cutout 274 formed in the common electrode 270 and including diagonal portions extending to have a predetermined angle with the cross-shaped cutout 94 of the pixel electrode 191 and a straight-line portion connected with the diagonal portion and extending to be parallel to the edge of the pixel electrode 191. Further, the diagonal portions may pass through the portion adjacent to the central portions of the four subregions of each subpixel electrode 191.

When the liquid crystal display is viewed from the top, the basic area defined by the cross-shaped cutout 94 of the pixel electrode 191 and the edge of the pixel electrode 191 may be divided into a plurality of domains Da, Db, Dc, and Dd, and the plurality of domains Da, Db, Dc, and Dd may be symmetrical to each other. The cross-shaped cutout 94 of the pixel electrode 191 may be an axis of symmetry.

The cutout 91 of the pixel electrode 191 is formed in a substantially quadrangular ring shape along the edge of the pixel electrode 191, and is disconnected around a portion corresponding to an end of the cross-shaped cutout 94 of the pixel electrode 191. As such, the disconnected portion of the cutout 91 formed on the pixel electrode 191 becomes a connecting portion of the pixel electrode.

The cutout 274 formed on the common electrode 270 is not overlapped with the cutout 91 formed along the edge of the pixel electrode 191. However, the cutout 274 may be overlapped with the cutout 91 formed along the edge of the pixel electrode 191.

The cutout 91 of the pixel electrode 191 may control the tilt directions of directors of the liquid crystal molecules disposed at the edge of the pixel electrode 191, more particularly, the azimuthal angles of the directors of the liquid crystal molecules, by controlling an effect of a fringe field which influences the edge of the pixel area.

The data voltage is applied to the pixel electrode 191 and the common voltage is applied to the common electrode 270 to generate an electric field in the liquid crystal layer 3 between the two panels 100 and 200. Then, the liquid crystal molecules 31 of the liquid crystal layer 3 are tilted substantially in parallel with a direction from four corner portions where two edges of the pixel electrode 191 extending in different directions meet each other toward the central portion of the cross-shaped cutout 94 of the pixel electrode 191, by a fringe field due to the cross-shaped cutout 94 of the pixel electrode 191 and the edges of the pixel electrode 191, in response to the electric field. In addition, tilt directions of the liquid crystal molecules 31 in one basic area of the field generating electrode becomes a total of four. That is, the tilt directions of the liquid crystal molecules 31 in each of the domains Da, Db, Dc, and Dd are different from each other.

In this case, the diagonal portion of the cutout 274 of the common electrode 270 extends in a vertical direction to the alignment direction of the directors of the liquid crystal molecules 31 in the plurality of domains Da, Db, Dc, and Dd. Accordingly, the liquid crystal molecules 31 adjacent to the diagonal portion of the cutout 274 of the common electrode 270 are tilted in a vertical direction to the extending direction of the diagonal portion of the cutout 274. The direction of the liquid crystal molecules 31 adjacent to the diagonal portion of the cutout 274 is parallel to the tilt directions of the liquid crystal molecules 31 by the fringe field due to the cross-shaped cutout 94 of the pixel electrode 191 and the edge of the pixel electrode 191. Accordingly, the cutout 274 of the common electrode 270 helps the liquid crystal molecules 31 disposed at the central portion of each domain be tilted in an averagely tilt direction in each domain. As a result, it is possible to prevent irregular movement of the liquid crystal molecules which may occur in the central portion of the domain by additionally controlling the tilt directions of the directors of the liquid crystal molecules in the central portion of each domain of the pixel area, more particularly, azimuthal angles of the directors of the liquid crystal molecules, thereby to prevent deterioration of display quality such as a texture due to the irregular movement of the liquid crystal molecules or deterioration of transmittance.

Then, results of transmittance of the liquid crystal display according to another Experimental Example of the present invention will be described with reference to FIGS. 23 and 24. FIGS. 23 and 24 are plan views illustrating results of transmittance of the liquid crystal display according to another Experimental Example of the present invention.

In the Experimental Example, in the case where the cutout 91 formed along the edge of the pixel electrode 191 is formed and the cross-shaped cutout 271 is formed on the common electrode 270 as illustrated in FIG. 23A, and after the basic area of the field generating electrode of the liquid crystal display is formed like the liquid crystal display according to the exemplary embodiment illustrated in FIG. 22 and a voltage having a predetermined magnitude is applied as illustrated in FIG. 24A, the basic area of the field generating electrode of the liquid crystal display is illustrated by an electron micrograph. In more detail, in the Experimental Example, after the azimuthal angles and the pretilt angles of the liquid crystal molecules of the liquid crystal layer corresponding to the field generating electrode of the liquid crystal display are defined to be the same as each other and an electric field having a predetermined magnitude is generated in the liquid crystal layer, the controlled degrees of the liquid crystal molecules are compared with each other. Simulation results for the respective cases are illustrated in FIG. 23 and FIG. 24B, respectively.

Referring to FIGS. 23 to 24, like the liquid crystal displays according to the exemplary embodiments of the present invention, when the basic area of the field generating electrode is formed, the azimuthal angles of the liquid crystal molecules may be controlled even in the central portion in each domain, and as a result, the alignment of the liquid crystal molecules is not irregular and thus deterioration of transmittance even in the central portion in each domain does not occur. Further, similarly to the liquid crystal display in the related art, as compared with the case of forming the basic area of the field generating electrode configuring the cross-shaped cutout and the cutout formed along the edge of the pixel electrode, like the liquid crystal display according to the exemplary embodiments illustrated in FIG. 20 or 22, in the case of forming the cutout having the diagonal portion which is vertical to the average tilt directions of the directors of the liquid crystal molecules of each domain, the alignment of the liquid crystal molecules is regular even in the central portion in each domain and thus the deterioration of transmittance does not occur even in the central portion of each domain.

Then, a cutout having a diagonal portion of the liquid crystal display according to another exemplary embodiment of the present invention will be described with reference to FIG. 25. FIG. 25 is a schematic view illustrating a part of the field generating electrode of the liquid crystal display according to another exemplary embodiment of the present invention.

Referring to FIG. 25, a ratio of a horizontal length Dx and a vertical length Dy of each domain may be controlled by controlling a width of a vertical portion of the cross-shaped cutout 94 formed on the pixel electrode 191. For example, as illustrated in FIG. 25A, in the case where widths of the horizontal portion and the vertical portion of the cross-shaped cutout 94 are almost the same as each other, the horizontal length Dx and the vertical length Dy of each domain may be the same as each other. On the contrary, as illustrated in FIG. 25B, in the case where the width of the horizontal portion of the cross-shaped cutout 94 is narrower than the width of the vertical portion, the horizontal length Dx of each domain may be smaller than the vertical length Dy. As such, in the case where the horizontal length Dx and the vertical length Dy of the domain Da are different from each other, the averagely tilt directions of the directors of the liquid crystal molecules may be different from each other.

In this case, the diagonal portion of the cutout 274 of the common electrode 270 may extend in a vertical direction to the averagely tilt directions of the directors of the liquid crystal molecules in the domain Da, by controlling lengths of the diagonal portion and the straight-line portion of the cutout 274 of the common electrode 270. For example, in the case of FIG. 25A, the diagonal portion of the cutout 274 of the common electrode 270 is inclined to form a first angle $\theta 1$ with the horizontal portion of the cross-shaped cutout 94, and the first angle $\theta 1$ may be about 45 degrees. In this case, the lengths of the horizontal portion and the vertical portion of the cutout 274 of the common electrode 270 may be almost the same as each other.

On the contrary, in the case of FIG. 25B, the diagonal portion of the cutout 274 of the common electrode 270 is inclined to form a second angle $\theta 2$ with the horizontal portion of the cross-shaped cutout 94 formed on the pixel electrode 191, and the second angle $\theta 2$ may be larger than about 45 degrees. In this case, the length of the vertical portion of the straight-line portion connected to the diagonal portion of the cutout 274 of the common electrode 270 is larger than the length of the horizontal portion, and as a result, the extending direction of the diagonal portion may be controlled.

As such, in the liquid crystal display according to the exemplary embodiment of the present invention, even though the pixel electrode is not formed to have a plurality of branch electrodes, a plurality of subregions having different tilt directions of the liquid crystal are formed to thereby increase a viewing angle of the liquid crystal display, the liquid crystal molecules are aligned in predetermined directions to thereby increase a response speed of the liquid crystal molecules, and the pixel electrode is divided into two portions to receive different voltages to thereby increase visibility and improve an aperture ratio and transmittance. Further, the tilt directions of the directors of the liquid crystal molecules even in the central portion of the subregion of the pixel area, more particularly, the azimuthal angles of the directors of the liquid crystal molecules may be additionally controlled. Accordingly, it is possible to prevent deterioration of display quality such as a texture due to irregular movement of the liquid crystal molecules or deterioration of transmittance by preventing the irregular movement of the liquid crystal molecules which may occur in the central portion of the domain.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a pixel electrode disposed on the first substrate;
a second substrate facing the first substrate;
a common electrode disposed on the second substrate; and
a liquid crystal layer disposed between the first substrate and the second substrate, the liquid crystal layer including a plurality of liquid crystal molecules,
wherein the common electrode includes a cross-shaped cutout, the cross-shaped cutout overlapping the pixel electrode and dividing the pixel electrode into a plurality of subregions,
wherein the pixel electrode includes a direction controller extending in a direction parallel to a line connecting an intersecting point of the cross-shaped cutout and a pixel corner edge opposing the intersecting point,
wherein each of the plurality of subregions is divided into nine small regions by dividing a width of each of the subregions into three equal parts and dividing a length of each of the subregions into three equal parts, and
wherein the direction controller is disposed exclusively in a center small region of the nine small regions.

2. The liquid crystal display of claim 1, wherein:
the direction controller is a cutout formed in the pixel electrode, or a concave portion or a convex portion of the surface of the pixel electrode.

3. The liquid crystal display of claim 2, wherein:
the pixel electrode has a cutout formed along one of edges of the pixel electrode.

4. The liquid crystal display of claim 2, wherein:
the liquid crystal molecules of the liquid crystal layer are aligned to have pretilts in a direction parallel to the line connecting the intersecting point of the cross-shaped cutout and the pixel corner edge opposing the intersecting point.

5. The liquid crystal display of claim 2, wherein:
the liquid crystal molecules of the liquid crystal layer are aligned to be substantially vertical to the surfaces of the first substrate and the second substrate when an electric field is not applied in the liquid crystal layer.

6. The liquid crystal display of claim 1, wherein:
the pixel electrode has a cutout formed along an edge of the pixel electrode.

7. The liquid crystal display of claim 1, wherein:
the liquid crystal molecules of the liquid crystal layer are aligned to have pretilts in a direction parallel to the line connecting the intersecting point of the cross-shaped cutout and the pixel corner edge opposing the intersecting point.

8. The liquid crystal display of claim 1, wherein:
the liquid crystal molecules of the liquid crystal layer are aligned to be substantially vertical to the surfaces of the first substrate and the second substrate when an electric field is not applied in the liquid crystal layer.

9. A liquid crystal display, comprising:
a first substrate;
a pixel electrode disposed on the first substrate;
a second substrate facing the first substrate;
a common electrode disposed on the second substrate; and
a liquid crystal layer disposed between the first substrate and the second substrate, the liquid crystal layer including a plurality of liquid crystal molecules,
wherein the common electrode includes a cross-shaped cutout, the cross-shaped cutout overlapping the pixel electrode and dividing the pixel electrode into a plurality of subregions,
wherein the pixel electrode includes a direction controller extending in a direction parallel to a line connecting an intersecting point of the cross-shaped cutout and a pixel corner edge opposing the intersecting point,
wherein each of the plurality of subregions is divided into four small regions by dividing a width of each of the subregions into two equal parts and dividing a length of each of the subregions into two equal parts, and
wherein the direction controller is disposed exclusively in a small region of the four small regions which is disposed farthermost from the intersecting point.

10. The liquid crystal display of claim 9, wherein:
the pixel electrode has a cutout formed along one of edges of the pixel electrode, and
wherein the direction controller extends from the cutout of the pixel electrode, the direction controller being a plurality of minute cutouts.

11. The liquid crystal display of claim 9, wherein:
the liquid crystal molecules of the liquid crystal layer are aligned to have pretilts in a direction parallel to the line connecting the intersecting point of the cross-shaped cutout and the pixel corner edge opposing the intersecting point.

12. The liquid crystal display of claim 9, wherein:
the liquid crystal molecules of the liquid crystal layer are aligned to be substantially vertical to the surfaces of the first substrate and the second substrate when an electric field is not applied in the liquid crystal layer.

13. A liquid crystal display, comprising:
a first substrate;
a pixel electrode disposed on the first substrate;
a second substrate facing the first substrate;
a common electrode disposed on the second substrate; and
a liquid crystal layer disposed between the first substrate and the second substrate, the liquid crystal layer including a plurality of liquid crystal molecules,
wherein the pixel electrode has a cross-shaped first cutout, the pixel electrode being divided into a plurality of subregions by the cross-shaped cutout, and wherein the common electrode includes a second cutout including a diagonal portion extending in a direction parallel to a line connecting two adjacent end points of the cross-shaped first cutout wherein the pixel electrode has a third cutout, the third cutout being formed along one of the edges of the pixel electrode, and wherein the second cutout is disposed between the cross-shaped first cutout and the third cutout.

14. The liquid crystal display of claim 13, wherein:
the second cutout further includes a straight-line portion extending to be parallel to an edge of the pixel electrode and protruding from the diagonal portion.

15. The liquid crystal display of claim 14, wherein:
the straight-line portion includes a horizontal portion and a vertical portion, and
lengths of the horizontal portion and the vertical portion are substantially the same as or different from each other.

16. The liquid crystal display of claim 15, wherein:
the third cutout is formed in a substantially quadrangular ring shape along the edge of the pixel electrode and is disconnected around a portion corresponding to an end of the cross-shaped first cutout of the pixel electrode.

17. The liquid crystal display of claim 16, wherein:
the third cutout of the pixel electrode is not overlapped with the second cutout of the common electrode.

18. The liquid crystal display of claim 14, wherein:
the liquid crystal molecules of the liquid crystal layer are aligned to have pretilts parallel to a line connecting the intersecting point of the cross-shaped first cutout and a pixel corner edge opposing the intersecting point.

19. The liquid crystal display of claim 14, wherein:
the liquid crystal molecules of the liquid crystal layer are aligned to be substantially vertical to the surfaces of the first substrate and the second substrate when an electric field is not applied in the liquid crystal layer.

20. The liquid crystal display of claim 13, wherein:
the pixel electrode further has a third cutout formed along one of the edges of the pixel electrode.

21. The liquid crystal display of claim 20, wherein:
the third cutout of the pixel electrode is not overlapped with the second cutout of the common electrode.

22. The liquid crystal display of claim 13, wherein:
the liquid crystal molecules of the liquid crystal layer are aligned to have pretilts parallel to a line connecting the intersecting point of the cross-shaped first cutout and a pixel corner edge opposing the intersecting point.

23. The liquid crystal display of claim 13, wherein:
the liquid crystal molecules of the liquid crystal layer are aligned to be substantially vertical to the surfaces of the first substrate and the second substrate when an electric field is not applied in the liquid crystal layer.

\* \* \* \* \*